United States Patent [19]
Hayashi et al.

[11] Patent Number: 5,247,499
[45] Date of Patent: Sep. 21, 1993

[54] OPTICAL CARD APPARATUS FOR RE-SEEKING BY MOVING AN OPTICAL HEAD IN A TRACKING DIRECTION

[75] Inventors: Yasuo Hayashi; Yoshimi Watanabe, both of Hachioji, Japan

[73] Assignee: Olympus Optical Co., Ltd., Tokyo, Japan

[21] Appl. No.: 744,733

[22] Filed: Aug. 14, 1991

[30] Foreign Application Priority Data

Aug. 15, 1990 [JP] Japan ................................. 2-214351
Dec. 6, 1990 [JP] Japan ................................. 2-400681

[51] Int. Cl.⁵ ............................................. G11B 7/00
[52] U.S. Cl. .................................. 369/32; 369/44.28; 235/476
[58] Field of Search ............. 369/32, 59, 44.27, 44.28, 369/44.26; 235/454, 475, 476, 479

[56] References Cited

U.S. PATENT DOCUMENTS

| | | | |
|---|---|---|---|
| 4,786,792 | 11/1988 | Pierce et al. | 235/454 |
| 4,817,067 | 3/1989 | Takahashi et al. | 369/32 |
| 4,885,458 | 12/1989 | Horiguchi et al. | 235/454 |
| 4,958,339 | 9/1990 | Koyama et al. | 235/454 |

FOREIGN PATENT DOCUMENTS

61-240481 10/1986 Japan .

Primary Examiner—Donald E. McElheny, Jr.
Attorney, Agent, or Firm—Armstrong, Westerman, Hattori, McLeland & Naughton

[57] ABSTRACT

In case an optical card having a plurality of tracks parallel with each other and having discriminating numbers inherent to the tracks recorded in the track width direction is moved in the track width direction to read the discriminating numbers and seek the target discriminating number, when the target discriminating number is judged to be unable to be [sought] found within the set number of times or the set time, the optical card will be moved by a minute amount in the tracking direction to make the seeking operation again.

33 Claims, 17 Drawing Sheets

OPTICAL CARD APPARATUS FOR RE-SEEKING BY MOVING AN OPTICAL HEAD IN A TRACKING DIRECTION

BACKGROUND OF THE INVENTION

1. Field of the Invention

This invention relates to an optical card apparatus wherein, in case a track number fails to be read, re-seeking will be made by moving an optical head in a tracking direction relatively to an optical card.

2. Description of the Related Art

Such card-like information recording medium as is shown in FIG. 1 has been already suggested. In this optical card 151, information is reproduced by detecting the reflection factor variation of the recording surface and is recorded by physically varying the recording surface. Such information is recorded or reproduced by a unit called a track and a plurality of linear band-like tracks 152 are parallelly arranged to form one optical card 151.

In the optical card 151 shown in FIG. 1, so that a target track may be sought, each track 152 is provided at both ends respectively with ID regions 153a and 153b in which its track number is recorded and between these ID regions with a data region 154 for recording data and also a card driving pattern 155 for controlling the card drive.

In such optical card 151 in which the track numbers of the ID regions 153a and 153b are recorded in the tracking direction, that is, the data leading direction, generally the track pulses are counted while the reading head is being moved in the track width direction, that is, the seeking direction, the movement of the reading head is stopped at a predetermined counted value, then the optical card 151 is moved in the leading direction and the track number is read so that the target track may be sought.

However, as described above, in reading the track number by moving the optical card 151 in the leading direction, there is a problem that, when the read track number is not of the target track due to a track pulse counting mistake or the like, unless after the data region 154 of the track is scanned, re-seeking will not be able to be made and therefore the access to the target track will take time.

In order to solve such problem, for example, in the publication of Japanese Patent Application Laid Open No.240481/1986, there is disclosed a system wherein a plurality of the track numbers of respective tracks are recorded at predetermined intervals in the tracks so that, when a mis-seek is produced, the target track may be sought by reading the track number of another track by moving the reading head in the seeking direction while moving the optical card 151 in the reading direction.

However, in order to seek the target track by moving the reading head in the seeking direction while moving the optical card 151 in the leading direction as mentioned above, there are problems that the formation and control will be complicated. That, in case the difference between the mis-sought track and the target track is large, the target track will not be able to be sought during the movement in the leading direction and that, when a plurality of the track numbers of respective tracks are recorded at predetermined intervals in the tracks, the data region will become so narrow that the recording capacity of the medium is effectively reduced.

SUMMARY OF THE INVENTION

An object of the present invention is to provide an optical card apparatus wherein a target track can be sought with a simple formation and control.

Another object of the present invention is to provide an optical card apparatus wherein a target track can be sought without narrowing the data region.

In seeking a target track by moving an optical head in the track width direction in an optical card having a plurality of tracks parallel with each other and having the track numbers of the respective tracks recorded in the track width direction, when the target track cannot be found by moving the optical head by a predetermined number of times, the target track will again be searched for by slightly moving the above mentioned optical head and optical card in the track length direction.

BRIEF DESCRIPTION OF THE DRAWINGS

FIGS. 2 to 11 relate to the first embodiment of the present invention.

FIG. 2 is a block diagram showing the general formation of the first embodiment.

FIG. 3 is an explanatory view showing an optical card used in the first embodiment.

FIG. 4 is a view showing the formation of tracks in the optical card in FIG. 3.

FIG. 7 is a view showing an example of a photodetector in FIG. 2.

FIG. 8 is a view showing a luminous intensity distribution of an illuminating light on an optical card.

FIG. 9 is a block diagram showing a functional formation of a system controller in FIG. 2.

FIG. 10 is a flow chart showing the operation in the case of seeking a target track in the first embodiment.

FIG. 11 is an explanatory view of a time of driving a motor moving an optical card in case seeking fails.

FIG. 13 is a formation diagram showing the schematic formation of an optical information recording/reproducing apparatus in the second embodiment.

FIG. 14 is a formation diagram showing the formation of an optical pickup.

FIG. 15 is a formation diagram showing the formation of an LED.

FIG. 16 is an explanatory view for explaining the spherical aberration of a sapphire spherical lens.

FIG. 17 is a format view showing a format of tracks of an optical card.

FIG. 18 is a structure view showing the structure of a photodetector.

FIG. 19 is an explanatory view for explaining a luminous intensity distribution of a photodetector.

FIG. 20 is a formation view showing the formation of a position controlling circuit.

FIG. 21 is a timing diagram for explaining the operation of a position controlling circuit.

FIG. 22 is a flow chart for explaining the seeking operation of an optical card.

DETAILED DESCRIPTION OF THE PREFERRED EMBODIMENTS

Figure 3:
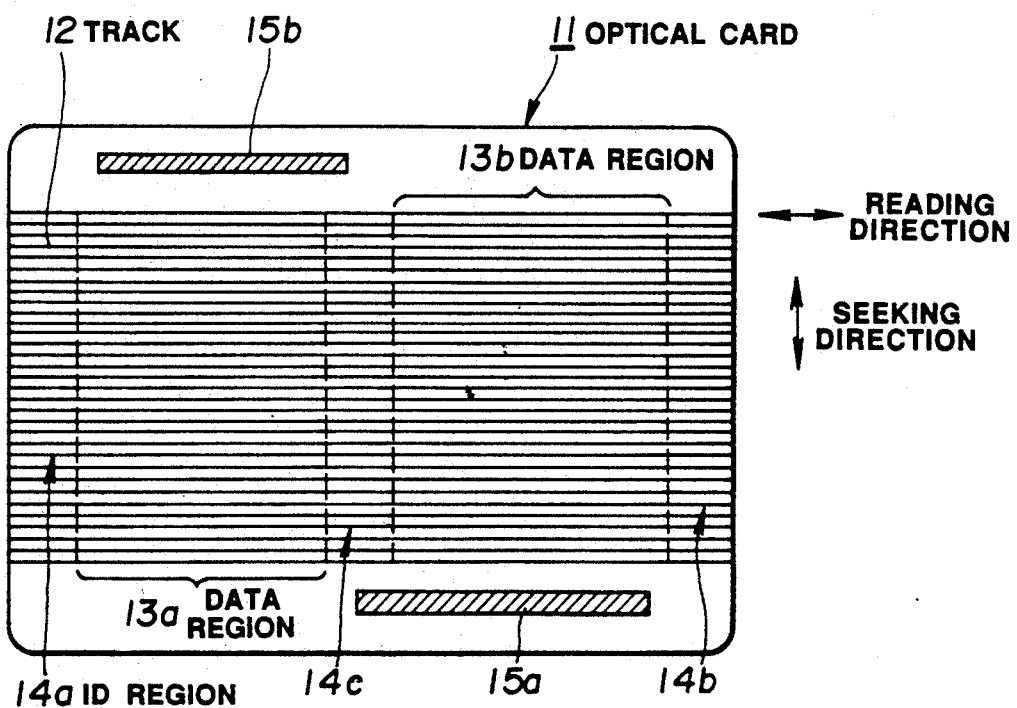

An optical card 11 as an optical recording medium to be used in an optical card recording/reproducing apparatus in the first embodiment is provided in an information recording region having many tracks 12 parallel with each other with two data regions 13a and 13b as divided in the tracking direction (data reading direction) as shown in FIG. 3 in which the optical card 11 is provided in the left end part with an ID region 14a continued to the data region 13a, in the right end part with an ID region 14b continued to the data region 13b and between the data regions 13a and 13b with an ID region 14c common to the data regions 13a and 13b and continued to these data regions 13a and 13b.

In this example, the track numbers in the data regions 13a and 13b are numbered in the order from the left above to the left below and from the right below to the right above in FIG. 3. In the case of recording/reproducing data in the data region 13a, the optical card 11 will be inserted into the recording/reproducing apparatus with the left end, that is, the ID region 14a in FIG. 3 at the head and will be reciprocated and driven in the regions of the ID regions 14a, data region 13a and ID region 14c. In the case of recording/reproducing data in the data region 13b, the optical card 11 will be inserted into the recording/reproducing apparatus with the right end, that is, the ID region 14b at the head, and will be reciprocated and driven in the regions of the ID region 14b, data region 13b and ID region 14c.

Further, in order to control the reciprocation and drive of the optical card in response to the above described data regions 13a and 13b, the optical card is provided thereon with a card driving pattern 15a corresponding to the data region 13a and a card driving pattern 15b corresponding to the data region 13b.

Figure 4:
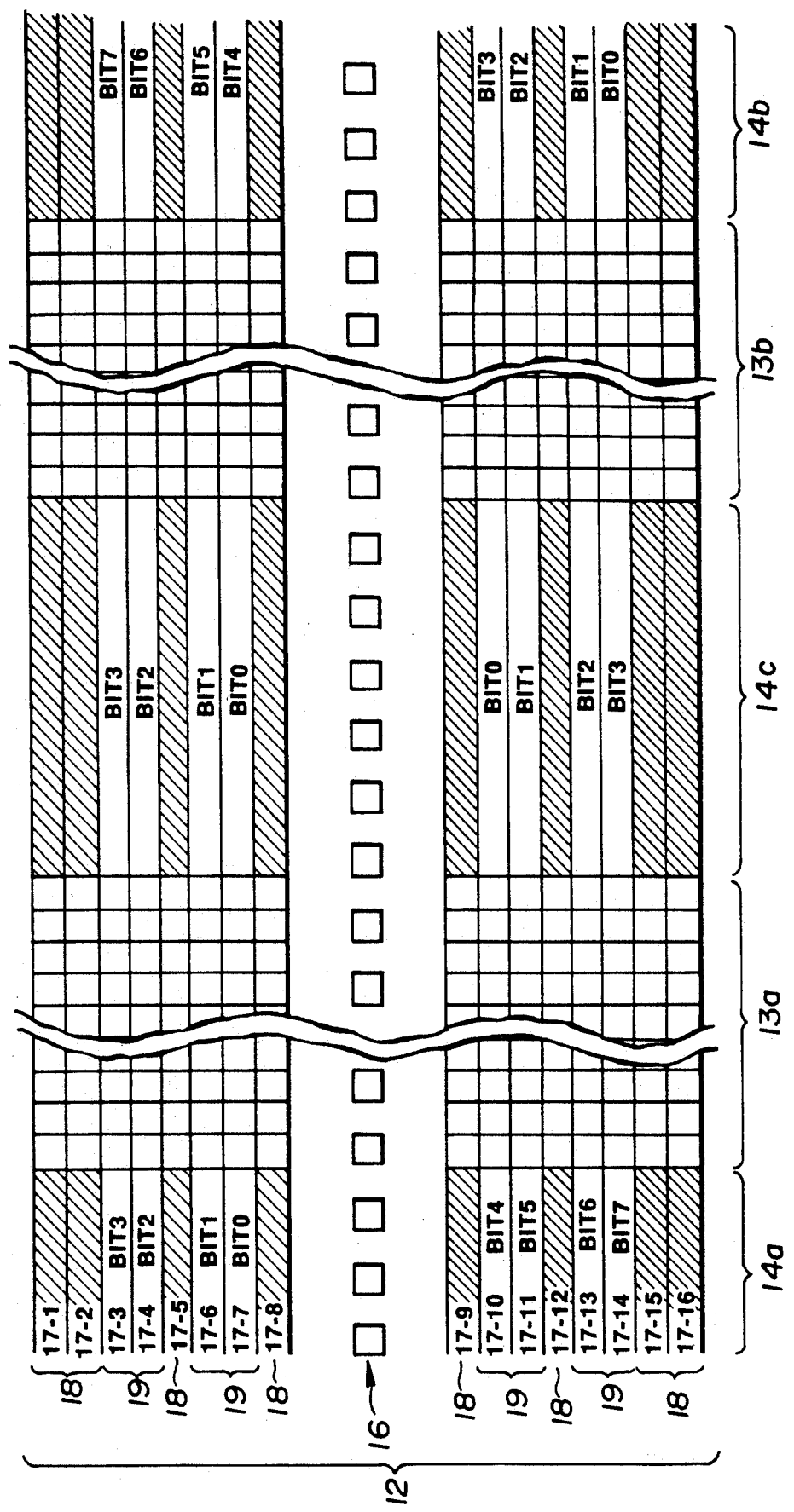

FIG. 4 shows the formation of the track 12 shown in FIG. 3. Each track 12 is formed of respectively eight lines 17-1 to 17-8 and 17-9 to 17-16 on both sides of a clock pattern 16. In this example, in ID regions 14a, 14b and 14c, the lines 17-1, 17-2, 17-5 and 17-8 and 17-9, 17-12, 17-15 and 17-16 among the sequential lines 17-1 to 17-16 are made identification pattern regions 18 in the lines of which binary codes, for example, 01111110 symmetrical with respect to the clock pattern 16 are recorded and the remaining eight lines are made track number pattern regions 19 in the lines of which track number patterns are recorded.

Here, for the track number patterns, in the ID regions 14a and 14b, the absolute values of the track numbers of the respectively corresponding data regions 13a and 13b are recorded with binary codes of eight bits and, in the ID region 14c, with the clock pattern 16 as a boundary, on one side, the lower 4 bits of the track number patterns of the data region 13a are recorded and, on the other side, the lower 4 bits of the track number patterns of the data region 13b are recorded.

The optical card apparatus for reproducing information recorded in such optical card 11 shall be explained in the following.

Figure 2:
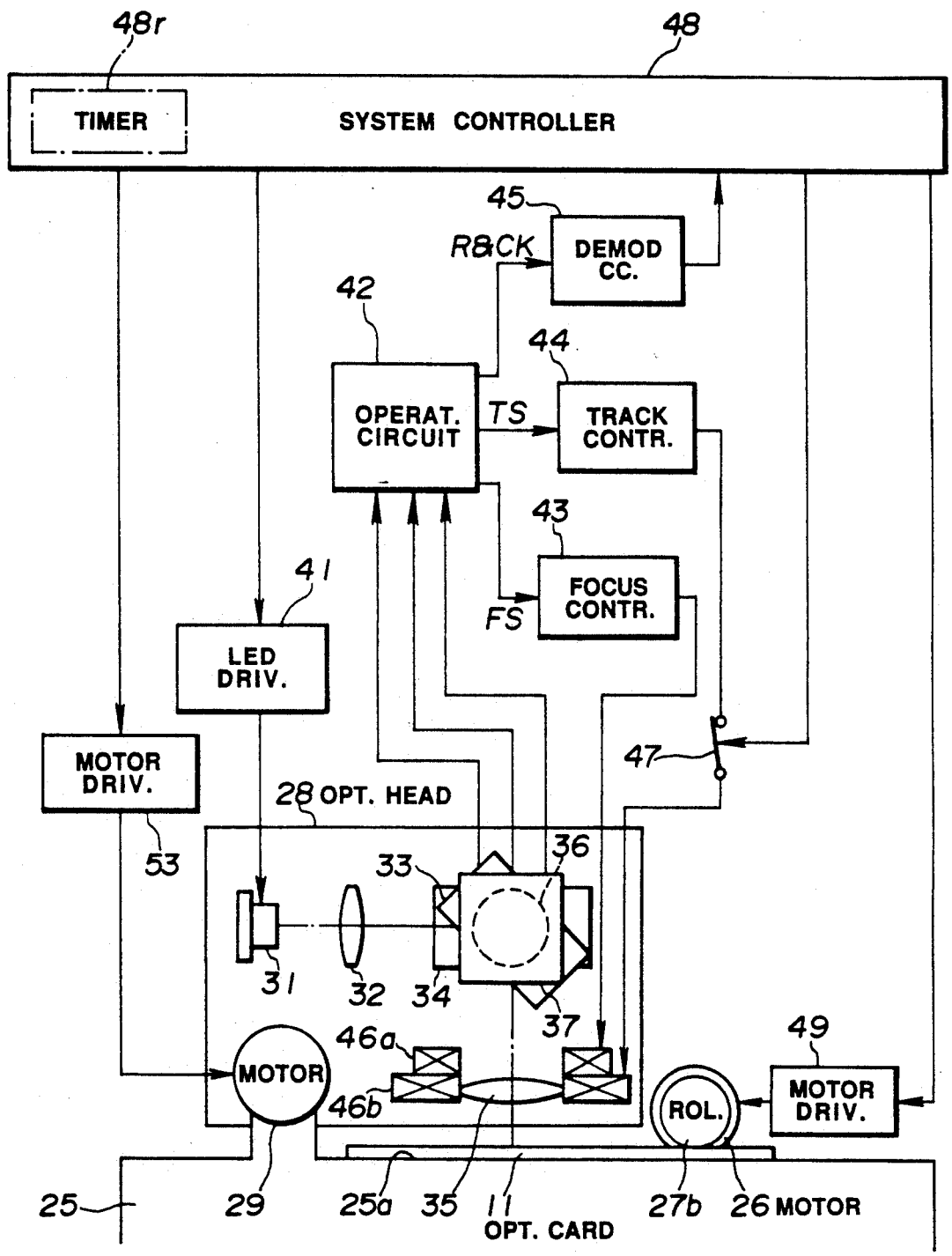
Figure 5A:
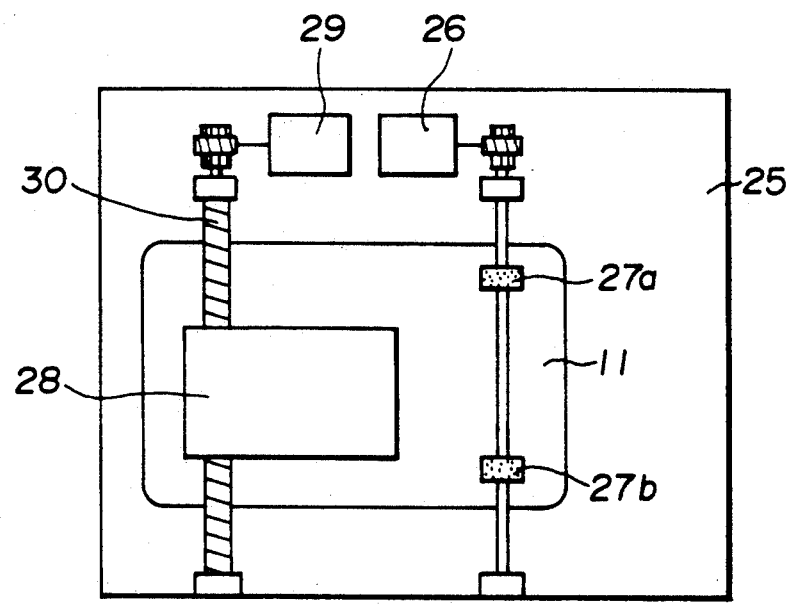
FIGS. 5A and 5B are a view showing a driving system in FIG. 2.
Figure 5B:
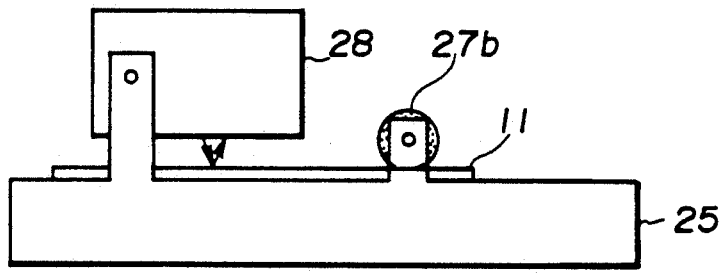

FIG. 2 shows the general formation of the optical card apparatus 1 of the first embodiment. The optical card 11 is mounted on a card mounting surface 25a on the upper surface of a frame 25 and is moved in the leading direction (that is, in the tracking direction of the optical card 11) through rubber rollers 27a and 27b (See FIG. 5A) rotated and driven by a card feeding motor 26.

An optical head 28 is arranged as opposed to the above mentioned optical card 11 and is moved in the seeking direction intersecting at right angles with the tracking direction through a screw thread 30 (See FIG. 5A) by a head feeding motor 29.

Figure 6A:
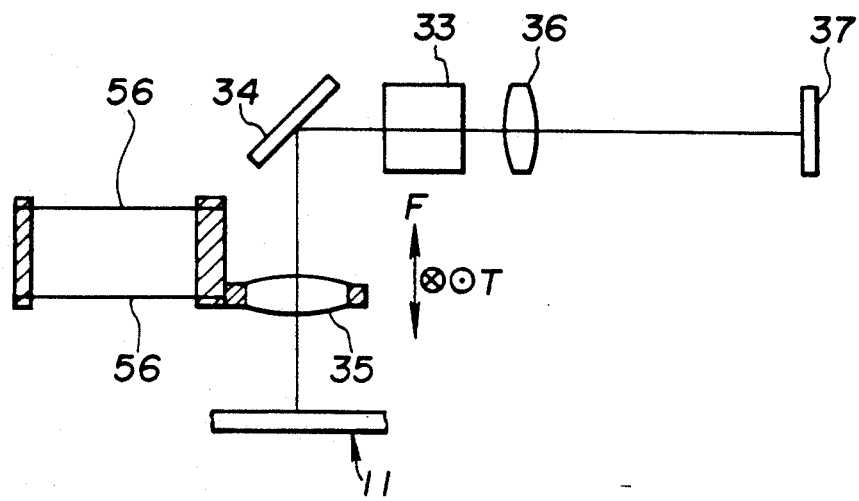
FIGS. 6A and 6B are a view showing an optical system in FIG. 2.
Figure 6B:
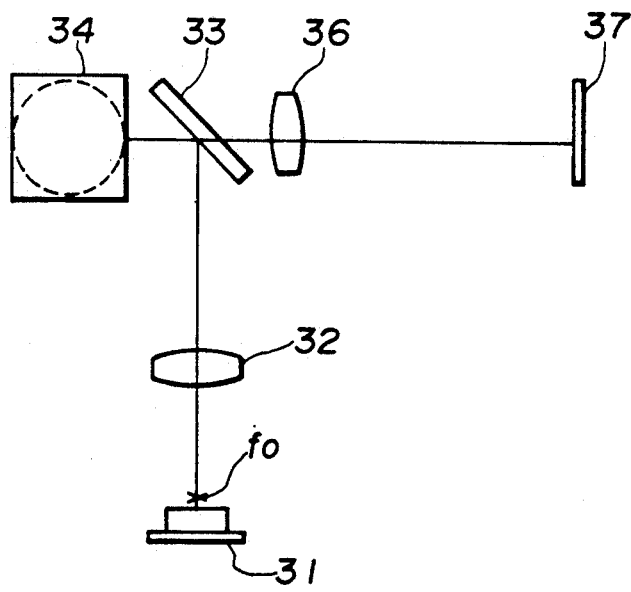

The light from a light emitting diode 31 housed in the above mentioned optical head 28 is made a substantially parallel light bundle by a collimating lens 32, as shown in FIGS. 2 and 6B, and is then partly reflected by a half mirror 33. This reflected light is reflected by a total reflecting mirror 34, is then condensed by an objective lens 35 and is radiated to the optical card 11. The reflected light of the light spot part radiated to this optical card is again condensed by the objective lens 35, is reflected by the mirror 34 and then enters the half mirror 33. As shown in FIG. 6B, the light having passed through this half mirror 33 is condensed by a lens 36 and is received by a photodetector 37.

Figure 7:
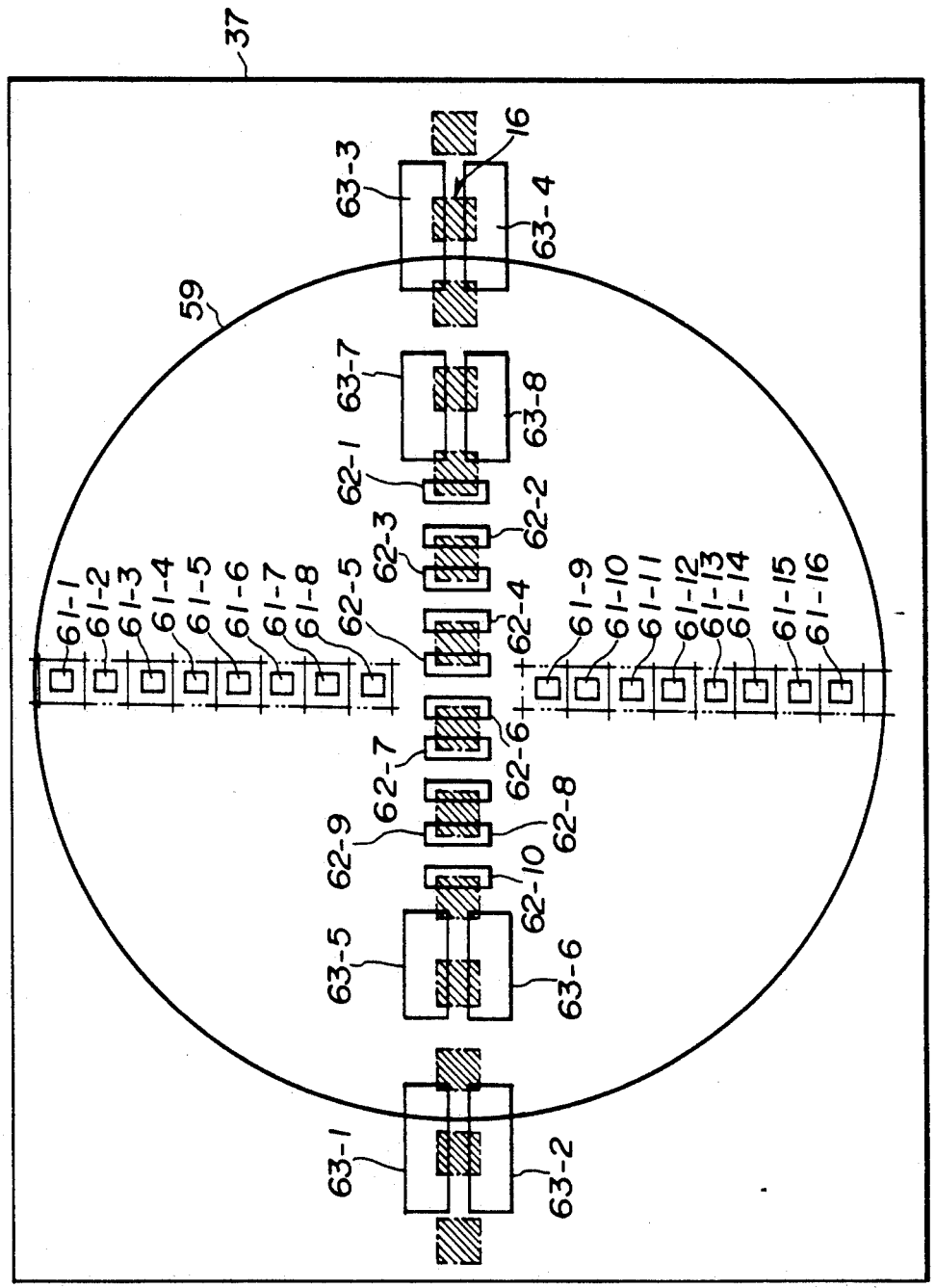

The above mentioned light emitting diode 31 is controlled in the light emitting amount by an LED driving circuit 41. As shown in FIG. 7, the photodetector 37 is formed of many light receiving regions and the signal photoelectrically converted by these respective light receiving regions is input into an operating circuit 42 formed of an adding and subtracting circuit and is subjected to an addition and subtraction to produce a focus error signal FS, track error signal TS and read & clock signal R & CK which are input respectively into a focus controlling circuit 43, track controlling circuit 44 and demodulating circuit 45.

The above mentioned focus controlling circuit 43 amplifies the focus error signal, compensates its phase and feeds it as a focus driving signal to a focus actuator coil 46a. With this focus driving signal, the focus actuator coil 46a moves the objective lens 35 in its optical axial direction in a minute range and holds it near the focus position with respect to the optical card 11.

The above mentioned track controlling circuit 44 amplifies the track error signal, compensates its phase and feeds it as a tracking driving signal to a tracking actuator coil 46b through a switch 47. By feeding the track error signal to the coil 46b through this switch 47, the light spot radiated to the optical card 11 holds the tracking servo state following the now illuminated track.

The above mentioned demodulating circuit 45 is used to reproduce the clock pattern of the optical card 11, produce a timing signal taking in a reading signal and demodulate the reading signal. It also demodulates the reading signal and outputs it to a system controller 48.

The above mentioned card feeding motor 26 is controlled by the system controller 48 through a motor driving circuit 49.

The above mentioned head feeding motor 29 is controlled by the system controller 48 through a motor driving circuit 53.

In seeking, the system controller 48 controls the optical head 28 to move in the seeking direction crossing the track through the motor driving circuit 53. In such seeking, the system controller 48 switches off the switch 47, then feeds a driving signal to the motor 29 through the motor driving circuit 53 to drive the motor 29 and controls the optical head 28 to move to the target track side.

As shown in FIG. 6A, the objective lens 35 forming the above mentioned optical head 28 is supported on a base, not illustrated through four parallel wires (two of which are shown in FIG. 6A) 56 so as to be displaceable in its optical axial direction (focus direction) F and the track width direction (track crossing direction) T of the optical card 11. When a driving signal is fed to the above mentioned coils 46a and 46b, the objective lens 35 will be able to be moved in the focus direction F and track crossing direction T against the wires 56.

Also, as shown in FIG. 6B, the LED 31 is arranged as displaced from the focus position $f_o$ of the collimating lens 32 or somewhat farther than the focus position $f_o$ in this example so that, in the focused state in which the optical card 11 is positioned in the object side focus position of the objective lens 35, the illuminating light from the LED 31 may be converged before the optical card 11 which may be illuminated as defocused. Thus, the luminous intensity distribution of the illuminating light on the optical card 11 will be as shown by the solid line in FIG. 8 when focused, will be as shown by the broken line in FIG. 8 when the optical card 11 has become near to the objective lens side and will be as shown by the one-point chain line in FIG. 8 when, on the contrary, the optical card has become far from the objective lens side.

Figure 8:
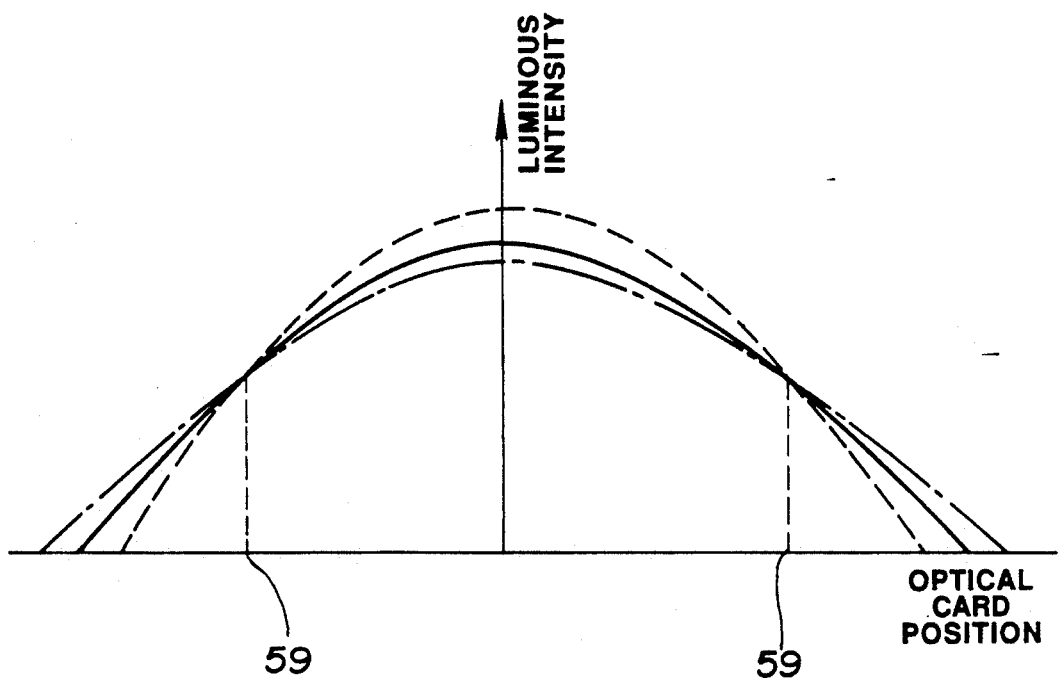

Thus, the luminous intensity distribution on the optical card 11 of the illuminating light varies in response to the distance between the objective lens 35 and optical card 11 but, as clear from FIG. 8, in the illuminated region, a ring-like invariable part (represented by a reference numeral 59 in FIG. 8) in which the luminous intensity will not substantially vary even if the distance between the objective lens 35 and optical card 11 varies is produced and, inside and outside this invariable part 59, the variation of the luminous intensity by the variation of the focused state of the objective lens 35 is reverse. That is to say, when the optical card 11 becomes nearer to the objective lens side than the focus position of the objective lens 35, the luminous intensity will be higher than at the focused time inside the invariable part 59 as a boundary but will be lower outside it but, on the contrary, when the optical card 11 becomes farther from the focus position of the objective lens 35, the luminous intensity will be lower than at the focused time inside the invariable part 59 but will be higher outside it.

In this example, the track of the optical card 11 is effectively illuminated inside the invariable part 59 and the variation of the above described luminous intensity distribution inside and outside this invariable part 59 as a boundary is utilized to detect a focus error signal. This invariable part 59 is so set as to be larger than one track width (See FIG. 7).

FIG. 7 shows the formation of an example of the photodetector 37 shown in FIGS. 6A and 6B. The photodetector 37 is provided in response to the images of the patterns projected on the optical card with 16 data reading light receiving regions 61-1 to 61-16 so that 16 data in the width direction in each track 12 may be simultaneously read. Also, so that the image of the clock pattern 16 may be received in each track 12, 10 clock producing light receiving regions 62-1 to 62-10 are provided in the tracking direction at a ½ pitch of the clock pattern image and, so that both edge parts in the track width direction of the clock pattern image may be received, 4 pairs of servo light receiving regions 63-1 to 63-8 are provided as separated and opposed in the track width direction. By the way, the data reading receiving regions 61-1 to 61-16, clock producing receiving regions 62-1 to 62-10 and servo receiving regions 63-5 to 63-8 are arranged in the positions corresponding to the inside of the invariable part 59 of the illuminating light of the LED 31 and the servo receiving regions 63-1 to 63-4 are arranged in the positions corresponding to the outside of the invariable part 59.

In this example, a focus error signal is obtained by determining the difference between the total sum of the light amounts received by the servo receiving regions 63-1 to 63-4 and the total sum of the light amounts received by the servo receiving regions 63-5 to 63-8 and a tracking error signal is obtained by determining the difference between the total sum of the light amounts received by the servo receiving regions 63-5 and 63-7 and the total sum of the light amounts received by the servo receiving regions 63-6 and 63-8.

Thus, in the seeking operation of seeking a target track, the ID region 14a, 14b or 14c is scanned by moving the optical head 28 in the track width direction (seeking direction) and the track number pattern is read at the time point when the identification pattern is sensed on the basis of the outputs of the data reading receiving regions 61-1 to 61-16 as synchronized with a clock signal generated in each zero cross of a tracking error signal. Also, in the reading operation of reading data recorded in the track 12, a clock signal is obtained on the basis of the outputs of the clock producing receiving regions 62-1 to 62-10 by moving the optical card 11 in the reading direction while making focusing and tracking servo by focusing and tracking error signals and data are reproduced by taking in the outputs of the data reading receiving regions 61-1 to 61-16 as synchronized with this clock signal.

Figure 9:
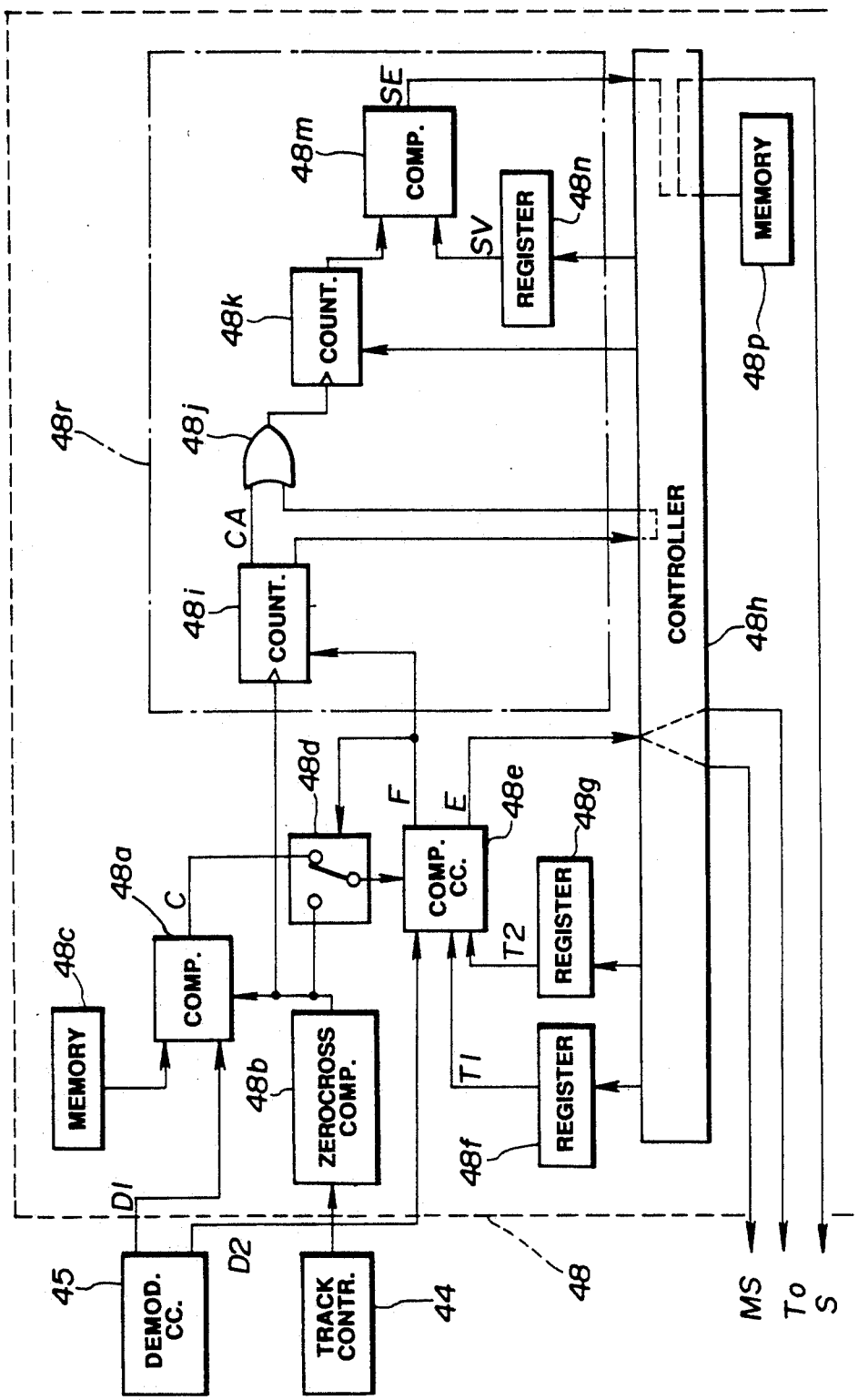

The optical card apparatus of this embodiment is provided with a means for re-seeking a target track by moving the optical head 28 in the tracking direction (reading direction) with respect to the optical card 11 in case it fails to seek the target track from the present track. This means is formed, for example, of a system controller 48. FIG. 9 shows its functional formation.

While the optical head 28 is moving the ID region 14a or 14b (or 14c) in the seeking direction, a signal received by the data reading receiving regions 61-1 to 16-16 and photoelectrically converted will be input into a demodulating circuit 45 and data D1 for an identification pattern of 8 bits which are a part of the demodulated 16 bits will be input into a comparator 48a. This comparator 48a is synchronized with the output pulse of a zero cross comparator 48b detecting the zero cross of a tracking error signal, compares whether the demodulated data D1 coincide with the data N of the identification pattern memorized in a memory 48c and judges whether the timing to read the track number of the track, that is, the center of the wide range illuminating light is present on the center of the clock pattern 16.

When it coincides, for example, by a coinciding signal C which will become "H", the comparator 48a will instruct a comparator circuit 48e through a switch 48d to judge whether the demodulated data D1 coincide with the target track number or not. The track number 8-bit data D2 other than the above mentioned demodulated data D1 and the data T1 of the target track number housed in a register 48f are input into this comparator circuit 48e, it is judged whether the two of the data D2 and T1 will coincide with each other or not at the timing of applying the above mentioned coinciding signal C and a signal E is output. In case the data D2 do not coincide with the data T1, this comparator circuit 48e will further compare the data D2 with the data T2 from a register 48g and adjacent to the data T1, will judge whether the center of the wide range illuminating light is in a position near to the target track or not and will output a signal F.

The above mentioned signal E is output to a controller 48h. In case the two of the data D2 and T1 coincide with each other, the controller 48h will output to the motor driving circuit 53 a movement stopping signal MS to stop the movement of the optical head 28 and will output a signal TO to switch on the switch 47. That is to say, the tracking servo loop will be on. (When this servo loop is on, an operation of tracking a target track will be made, then the track number will be read and it will be judged whether the target track is being actually tracked or not.)

In case it is judged that a position near to the target track is being scanned, the switch 48d will be switched over by a signal F and the operation of judging whether the two of the data D2 and T2 by the comparator circuit 48e coincide with each other or not will be made at each output pulse of the zero cross comparator 48b. Also, this signal F is used as a signal for making a counter 48i start counting. This counter 48i counts the output pulses of the zero cross comparator 48b. When the counted value of this counter 48i becomes above a fixed value, a pulse CA will be output to a counter 48k through an OR gate 48j from a carrying terminal. This counted value is set to be a value larger than the number of zero crosses from an adjacent track to a target track and is usually judged to coincide with the target track before the pulse CA is output.

When the read track number is judged to coincide with the target track, as described above, the comparator circuit 48e will output a signal E to the controller 48h which stops the optical head 28 and then controls to switch on the servo loop. After this servo loop is switched on, the track number is read and, when the read data D2 coincide with the data T1, the seeking will end.

On the other hand, in the case of the signal E in which the read data D2 are not judged to coincide with the data T1, the controller 48h will increase by one the counted value of the counter 48k through the OR gate 48j. The output of this counter 48k is input into a comparator 48m and is compared therein with the set value SV of a register 48n set by the controller 48h. When it becomes above this set value SV, a signal SE over the set value, that is, of the seeking failure will be output to the controller 48h. By the way, the counter 48k may be operated as an SV counter so that, when the count becomes above SV, the over-count signal SE may be output.

When the signal SE is input, this controller 48h will control the re-seeking operation of seeking again. In the case of this re-seeking operation, the controller 48h will first output a signal S of operating a motor driving circuit 49 for a fixed time and, by this motor driving circuit 49, the optical card 11 will be moved by a fixed amount in the reading direction, that is, the direction parallel with the track. As the seeking operation often fails because a defective part is in the target track itself or is produced by dust or the like, the optical card 11 is displaced from the defective part by this movement.

After this optical card 11 is moved, the controller 48h will clear the counter 48k, will move the optical head 28 in the seeking direction and will control the operation of seeking the above mentioned target track again. By the way, in the case of moving the optical card 11, with reference to the moving characteristics (that is, the information relating to the moved amount of the optical card 11 after the driving signal is fed to the motor 26 by the motor driving circuit 49) of the optical card 11 by the motor 26 as memorized in a memory 48p, the above mentioned controller 48h will output a signal S to the motor driving circuit 49 for a time required to move the optical card 11 by a fixed amount.

The seeking operation of this embodiment shall be explained in the following with reference to the flow chart shown in FIG. 10.

First of all, the tracking is made off (the switch 47 is off), then the counter 48k in FIG. 9 is reset and the number of times considered to be of seeking errors is set in the register 48n. Therefore, in this state, the over-count (the counted value of the counter 48k above the set value SV) will not be produced.

Then, the head 28 is moved by the seeking motor in the seeking direction intersecting at right angles with the track with respect to the optical card 11 (S2). Thereby, while scanning the ID region 14a, 14b or 14c, as synchronized with the clock signal generated at each zero cross of the tracking error signal, on the basis of the outputs of the data reading receiving regions 61-1 to 61-16, the track number pattern at the time point when the identification pattern is sensed is read (S3) and whether it is of the target track or not is judged (S4).

Here, if the read track number pattern is of the target number, the drive of the seeking motor 29 will be stopped (S5). the tracking servo will be made a closed loop (tracking on) (S6) and the track number pattern will be read again (S7). As a result, if there is no deflection by tracking and the read track number is judged to coincide with the target track number (S8), the seeking operation will be thereby completed.

By the way, in the case of reading the ID regions 14a and 14b, by re-arranging the bits of the read track number pattern, the track number will be of the track of the corresponding data regions 13a and 13b as it is but, as only lower 4 bits of bits 0 to 3 of the respective track numbers of the data regions 13a and 13b are recorded in the ID region 14c, the corresponding upper 4 bits will be controlled by a microprocessor unit (MPU) forming the comparing circuit 48e and the track number will be calculated on the basis of the data of the upper 4 bits and the data of the read lower 4 bits. Here, the absolute track number (abbreviated as BT hereinafter) before beginning to read the ID region 14c is already read and known.

In calculating the track number by this ID region 14c, in consideration of the reading mistake and the movement of the reading head 28 within the width of the lower 4 bits, only when the upper 2 bits (bits 2 and 3) of the lower 4 bits vary from 00 to 11, that is, when the track number decreases by one and when they vary from 11 to 00, that is, when the track number increases by one, the track number will be calculated respectively by −1 and +1 to the upper 4 bits.

Concretely, first, the lower 4 bits of the read present track number and the upper 4 bits of the absolute track number BT before beginning to read controlled by the MPU are added together and the obtained value is made X (8 bits). Then, it is checked whether the bits 2 and 3 of the lower bits of X are 00 or 11. In case they are 00, further the bits 2 and 3 of the lower bits of BT (8 bits) will be checked. Here, in case the bits 2 and 3 of BT are 11, the track number will increase by one more than BT and therefore, in this case only, the upper 4 bits of X+1 will be made the track number but, in other cases, X as it is will be made the track number.

In the same manner, in case the bits 2 and 3 of the lower bits of X are 11, the bits 2 and 3 of the lower bits of BT will be checked. In case they are 00, the track number will decrease by one less than BT and therefore, in this case only, the upper 4 bits of X−1 will be made the track number but, in other cases, X as it is will be made the track number.

By the way, in case the bits 2 and 3 of the lower bits of X are other than 00 and 11, X as it is will be made the track number.

Thus, when the lower 4 bits of the track number pattern of the data regions 13a and 13b are respectively recorded in the ID region 14c, the track number of the corresponding data regions 13a and 13b in the ID region 14c will be able to be known.

On the other hand, in reading the track synchronized with the zero cross of the tracking error signal, when it does not coincide (S4), it will be judged whether the read track number is of a track adjacent to the target track or not and, when it is not of the adjacent track, further seeking will be continued. On the contrary, when it is of the adjacent track, the track number will be read as synchronized with the zero cross of the tracking error signal by the movement of the head 28. That is to say, the track number will be read (S10) as synchronized with the output of the zero cross comparator 48b by switching the switch 48d in FIG. 9 and whether the target track is detected within the predetermined zero cross number or not is judged by monitoring the counted value of the counter 48i (S11). When the target track is detected within the predetermined zero cross number, the movement of the head 28 will be stopped (S5) and the operation after the above mentioned S5 will be made. Even if the predetermined zero cross number is reached, when the target track is not detected, the counter 48j will output a carry pulse CA to the counter 48k through the OR gate 48j and will count up this counter 48k (S12). Then, it is judged by the comparator 48m whether the counted value of this counter 48k is above the set value SV or not (S1). If it is below SV, the operations in and after the step S2 will be made.

In reading the track number (S7) after the tracking on (S6), in case the reading head 28 is displaced by the tracking and the read track number is different from the target track (S8), the tracking will be made off (S13), the counter 48k will be counted up, the process will return to the step S1 and the seeking will be made again.

In the above seeking operation, even if the counter 48k reaches the predetermined counted value, when the target track can not be sought, a defect will be considered to be in the target track of the ID region 14a, 14b or 14c and the comparator 48n will output a signal SE that the seeking fails, then the optical card will be slightly moved in the tracking direction in which the identification patterns and track numbers are continuously recorded by the card motor 26(S15), the counter 48k will be cleared (S16) and the seeking will be made again.

Figure 11:
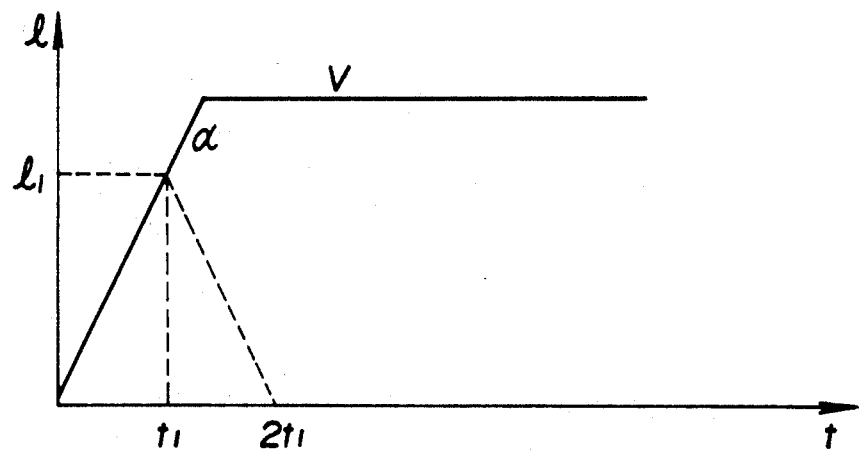

Here, the time required for the slight movement of the optical card 11 in the tracking direction is determined depending on the speed of the optical card 11 and the size of the anticipated defect. For the required time, a voltage is applied to the card motor 26 to slightly move the optical card 11 in the tracking direction. For example, as shown in FIG. 11, in case the optical card 11 is driven by an equal accelerating motion in rising (starting) and falling (ending), if the rising and falling distance is 2.5 mm and the car speed at the time of a constant speed is 300 mm/sec, from $$l_1 = \tfrac{1}{2} \cdot a t_1^2 \text{ and}$$

$$v = a t,$$

$$a = v^2/2l_1 = 18(\text{m/sec}^2).$$

Therefore, if the size in the tracking direction of the likely defect is 100 μm, in order to avoid this defect, a voltage may be applied to the card motor 26 for a time twice as long as the time for moving the optical card 11 for at least 50 μm which is half the size of 100 μm or preferably for 50 μm. Therefore, from $$t_1 = (2 \times 50 \times 10^{-6}/18)^{\tfrac{1}{2}} = 2.36 \times 10^{\tfrac{1}{2}} \text{sec}$$

$$2 t_1 = 4.71 \times 10^{-3} \text{ sec}$$

the required card moving time will be $4.71 \times 10^{-3}$ sec. The controller 48h reads the above mentioned time $2 t_1$ from the memory 48p and drives the card motor 26 for this time of $2 t_1$.

By the way, the movement in this tracking direction need not always be on track.

Thus, even if the seeking is made predetermined number of times of the predetermined value SV, when the target track can not be located, if the optical card 11 is slightly moved in the reading direction and re-seeking is made, the reading error of the track number or the like by a defect or the like will be able to be effectively prevented from being generated and therefore, in case a mis-seeking is produced, the target track will be able to be efficiently sought without narrowing the data regions. Also, in such case, the optical card 11 may be slightly moved in the tracking direction while the head 28 is stopped. Therefore, the formation and control can be made simple.

After the target track is sought as in the above, while the focusing and tracking servo are being made by the focusing and tracking error signals, the optical card 11 will be moved in the tracking direction to obtain a clock signal on the basis of the clock pattern 16, the information recorded in the corresponding data region 13a or 13b as synchronized with this clock signal will be read ands the data will be reproduced.

By the way, in the above described embodiment, the identification pattern and track number pattern are respectively of 8 bits but are not limited to be of 8 bits and can be set to be of any number of bits.

As described above, according to the first embodiment, when the target track can not be sought by the predetermined number of times of the movement of the reading head, the reading head and information recording medium will be relatively and slightly moved in the track length direction and the target track will be sought. Therefore, without narrowing the data regions, the generation of the reading error of the track number or the like by the defect or the like will be able to be effectively prevented and, in case mis-seeking is produced, the target track will be able to be efficiently sought. Also, in such case, the information recording medium may be slightly moved in the track length direction while the reading head is stopped and therefore the formation and control can be also made simple.

In the above mentioned first embodiment, the optical card 11 is moved in the tracking direction and the optical head 28 is moved in the track crossing direction but the optical card 11 may be moved in the track crossing direction and the optical head 28 may be moved in the tracking direction.

Figure 10:
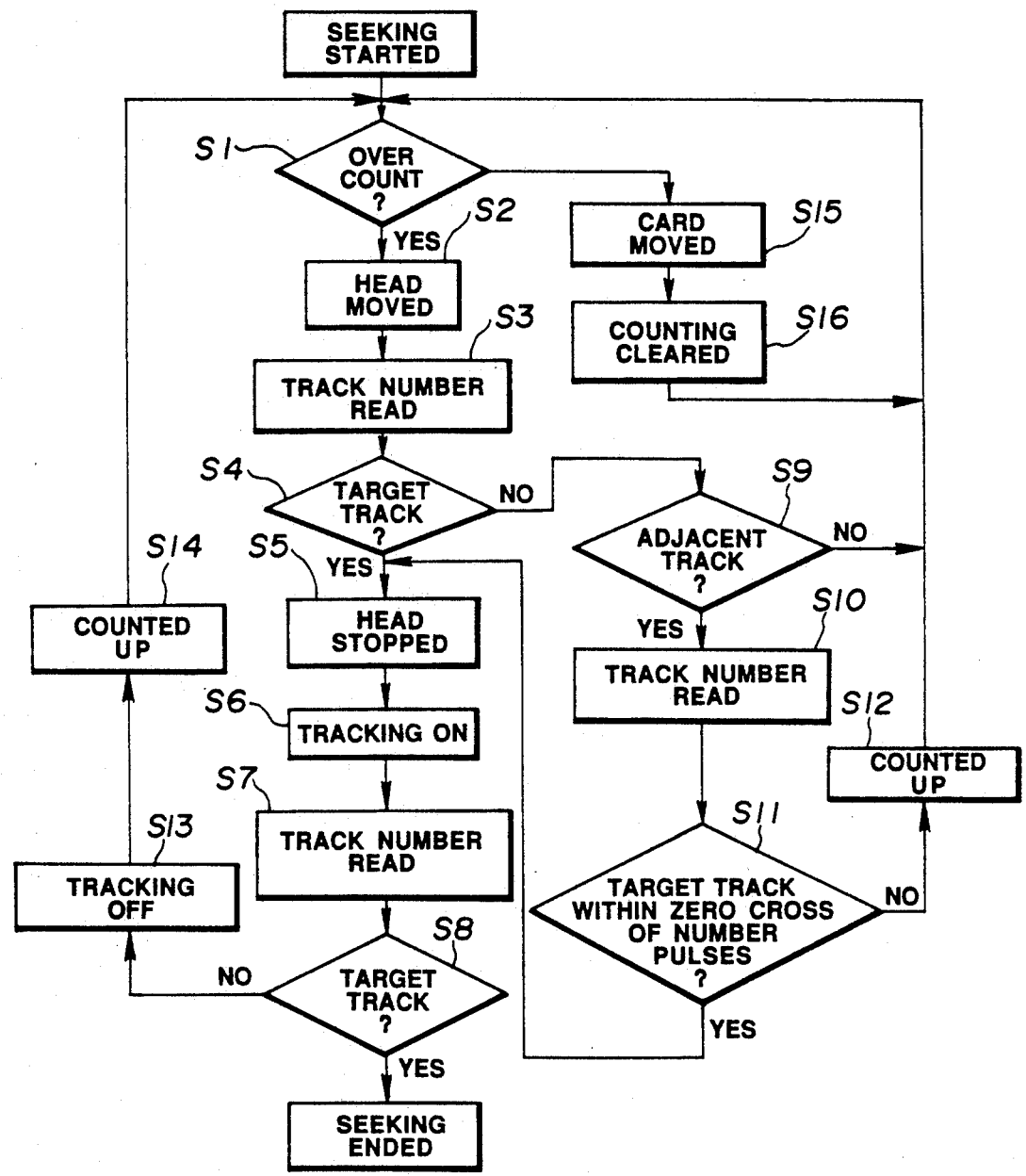

By the way, in the flow in FIG. 10, in the steps S12 and S14, the same counter 48k is counted up but respectively separate counters may be counted up, in the step S1, the counted values of both counters may be inspected, when at least one becomes above the set value, the optical card 11 may be moved in the tracking direction and re-seeking may be made.

By the way, in the flow in FIG. 10, in case an adjacent track is judged by the judgment of the step S9, as synchronized with the zero cross pulse, the track number is read but the process is not to this and may be made with the timing detecting the identification pattern (the track number may be read without switching the switch 48d in FIG. 9).

In the above mentioned first embodiment, the excess of the set value SV of the number of times from the seeking start to the re-seeking is judged to be a seeking failure, the optical card is slightly moved in the tracking direction and seeking is made again but, in FIG. 9, the block shown by the one-point chain line may be omitted, a timer (represented by 48r in FIG. 2) may be provided and started with the seeking start and the overtime may be judged instead of judging the over-count in the step S1 in FIG. 10. In such case, the counting up in FIG. 10 will not be necessary and the timer will be reset instead of clearing the count.

Figure 12:
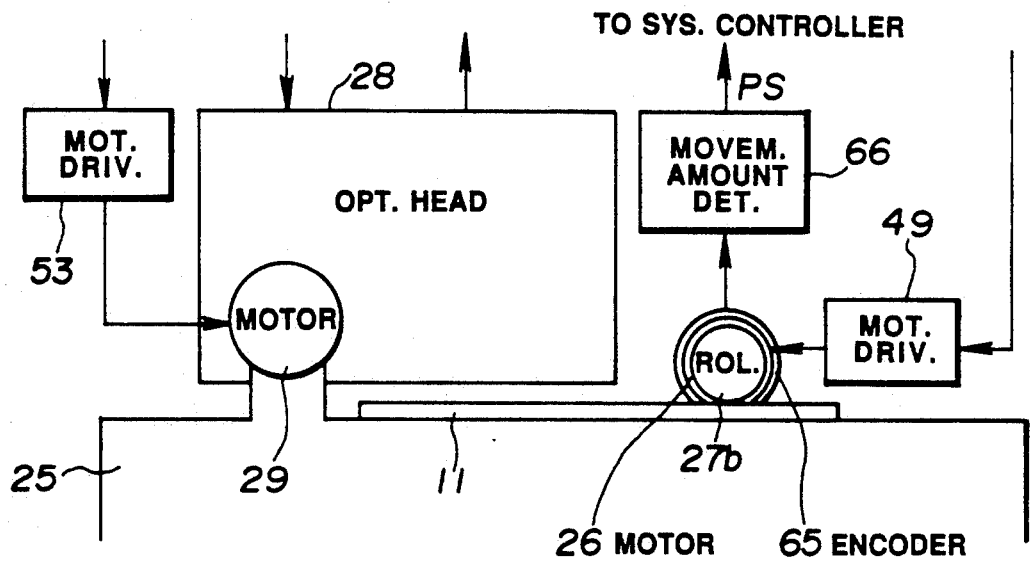
FIG. 12 is a view showing main parts in a modification of the first embodiment.

FIG. 12 shows a part of a modification of the first embodiment of the present invention. In this modification, the rotary shaft of the motor 26 moving the optical card 11 in the tracking direction is fitted with a rotary, encoder 65 by which the movement of the optical card 11 in the tracking direction is detected, for example, by pulses (the moving direction can be detected by the relative phases of two pulses), the position in the tracking direction is detected by counting the number of pulses in a moved amount detecting circuit 66 and a position signal PS is output to the system controller 48. In this modification, as shown in the step S15 in FIG. 10, in case the optical card 11 is moved, by this position signal PS, when the optical card 11 has been moved by a fixed amount in the tracking direction, the movement to the motor 26 will be controlled to be inhibited. By considering in advance the moved amount from the time when this movement is inhibited until it actually stops, the optical card 11 can be moved by any moved amount. The other formations are the same as in the first embodiment and shall not be explained here.

Figure 13:
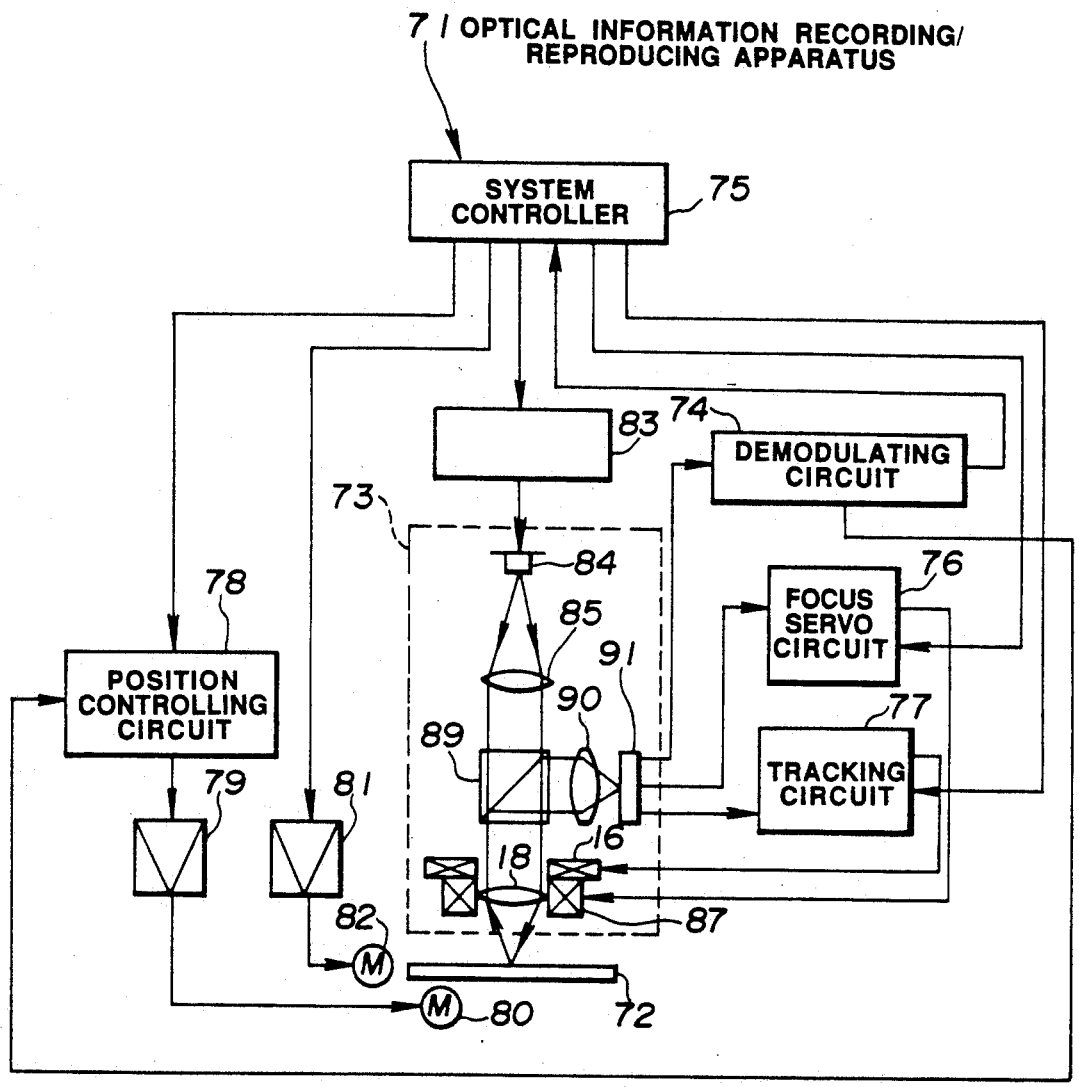
FIGS. 13 to 22 relate to the second embodiment of the present invention.

FIG. 13 shows the second embodiment of the present invention. In this embodiment, the moved amount in case the optical card is moved in the tracking direction is detected on the basis of a signal having read the moved amount by using an optical head (optical pickup) and can be detected at a high precision.

As shown in FIG. 13, an optical recording/reproducing apparatus 71 at least optically recording or reproducing information comprises a system controller 75 controlling this optical recording/reproducing apparatus 71, an optical recording medium to be inserted and arranged in the above mentioned optical recording/reproducing apparatus 71 such as, for example, the optical card 11 shown in FIG. 11, an optical pickup 73 radiating a light to this optical card 11 and receiving the reflected light, a demodulating circuit 74 demodulating an image taking signal of the reflected light photoelectrically converted by this optical pickup 73, a focus servo circuit 76 controlling the focus from the image taking signal of the above mentioned reflected light, a tracking servo circuit 77 controlling the tracking from the image taking signal of the above mentioned reflected light, a position controlling circuit 78 positioning the above mentioned optical card 11 by a control signal from the above mentioned system controller 75 and a clock signal from the above mentioned demodulating circuit 74, a head motor 82 moving the above mentioned optical pickup 83 in the seeking direction through a driving circuit 81 by the control signal from the above mentioned system controller 75 and a card motor 80 moving the above mentioned optical card 11 in the tracking direction through a driving circuit 79 by the control signal from the above mentioned position controlling circuit 78.

Figure 14:
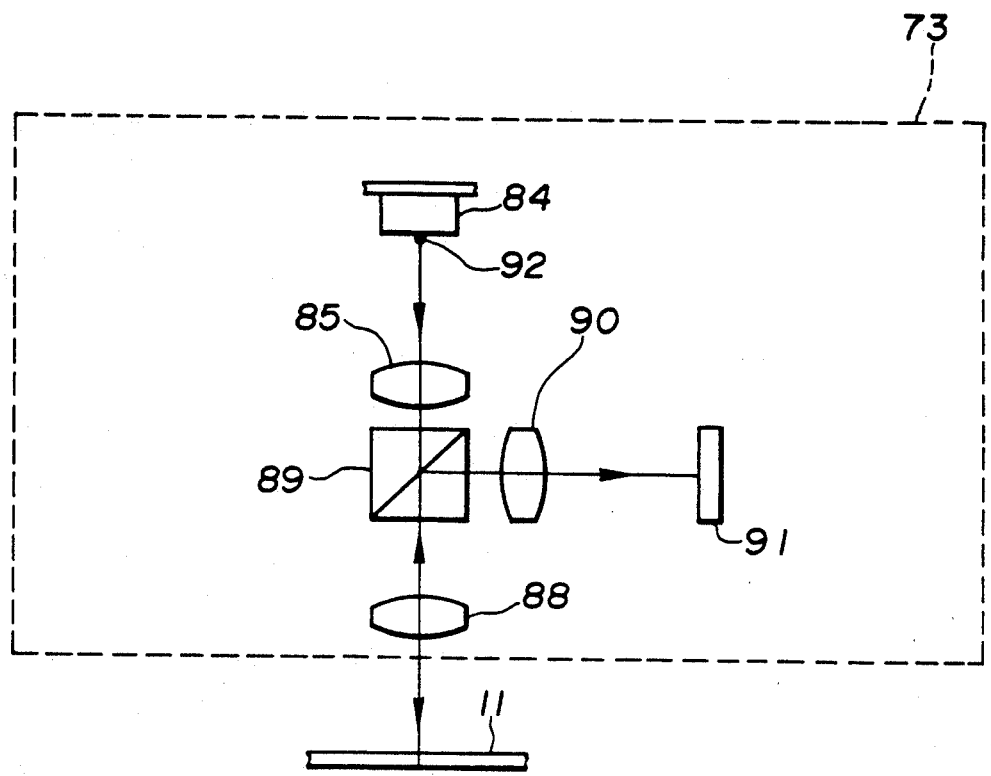
Figure 15:
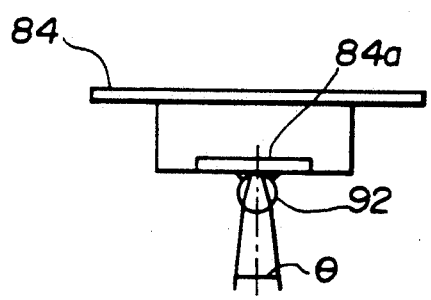
Figure 16:
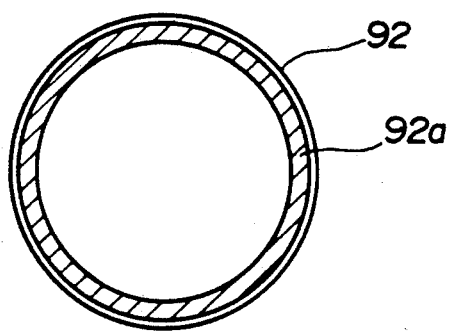

As shown in FIG. 14, by the optical pickup 73, a light from such light source as, for example, an LED 84 is radiated to the recording surface of the optical card 11 successively through a sapphire spherical lens 92 of a refractive index of about 1.8 having a spherical aberration, a collimating lens 85, a beam splitter 89 and an objective lens 88 and the reflected light can be received by a photodetector 91 successively through the above mentioned objective lens 88, the above mentioned beam splitter 89 and an image forming lens 90. As shown in FIG. 15, the sapphire spherical lens 92 is contacted with a light emitting part 84a of the above mentioned LED 84 by coinciding with the optical axis center and is bonded and fixed to this LED 84. For example, in case the diameter of the above mentioned light emitting part 84a is 35 $\mu$m and the diameter of the above mentioned sapphire spherical lens 92 is 500 $\mu$m, the radiation angle $\theta$ of the light emitted from this sapphire spherical lens 92 will be about 11 degrees and, as shown in FIG. 6, a ring-like bright part 92a of a diameter of about 400 $\mu$m will be formed by the spherical aberration on the spherical surface of the sapphire spherical lens 92.

Figure 17:
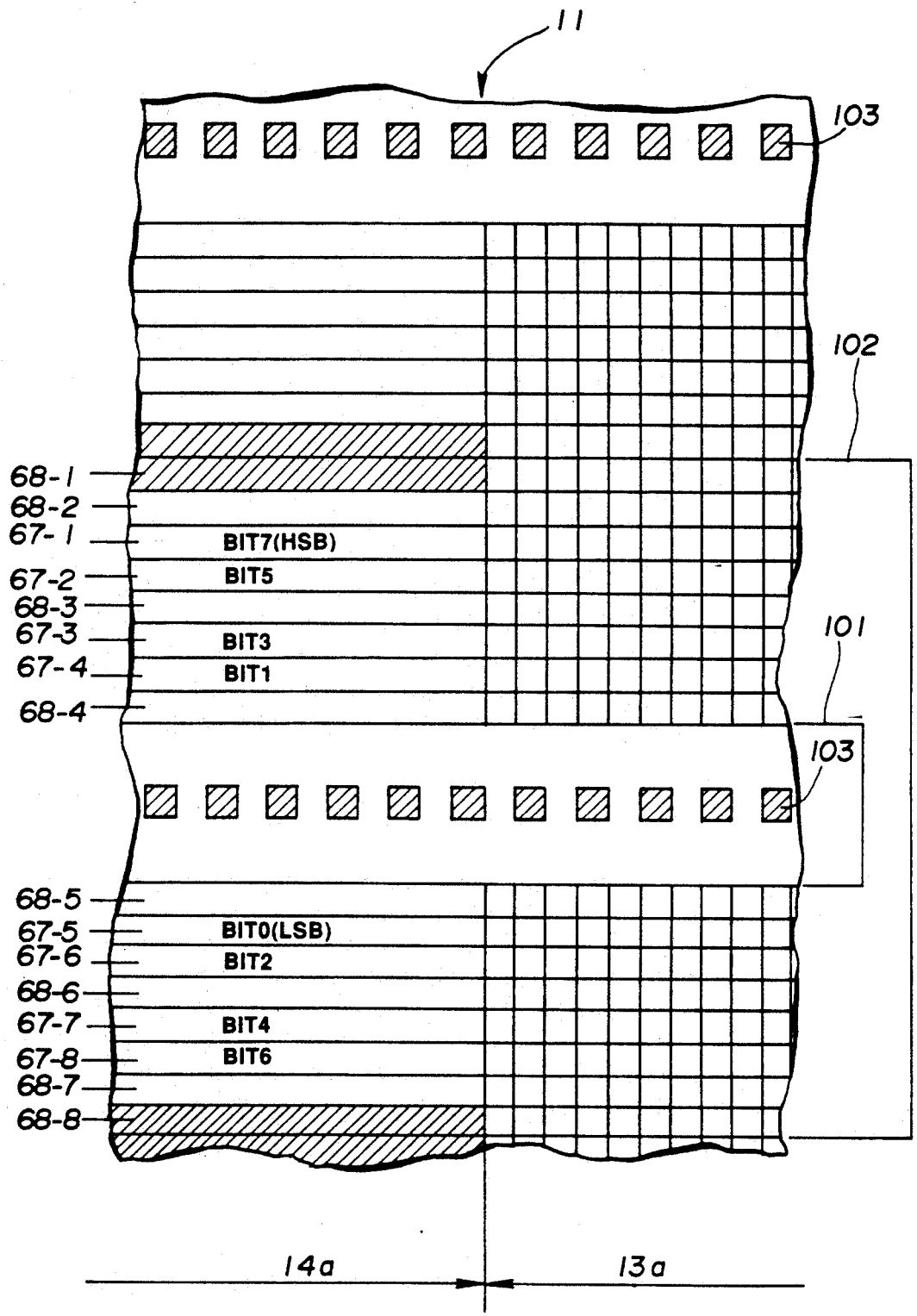

As an example of the track format of the optical card 11, as shown in FIG. 17, the track format comprises a guide pattern 103 formed of black and white patterns extended in the tracking direction in the central guide line 101 within a track 102 and a data pattern formed of a total of 16 bits of respective 8 bits in the track width direction on both sides of this guide pattern 103. In the ID region 14a, this data pattern comprises a track inherent pattern formed of bands 68-1 to 68-8 extending, for example, over 3 mm in the tracking direction and a track number pattern formed of bands 67-1 to 67-8 and having the respective track numbers identified and, in the data region 66a, the data pattern comprises data in which 16 bits consisting of, for example, dots of 5×5 $\mu$m are recorded.

Figure 18:
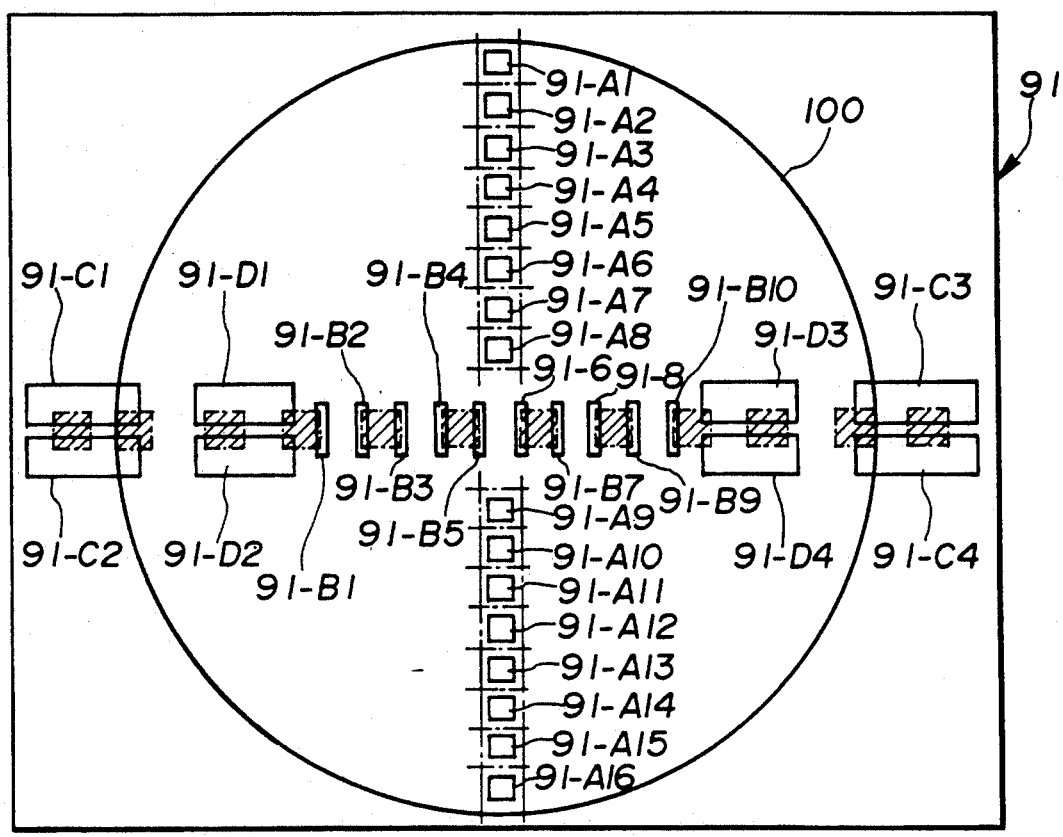

As shown in FIG. 18, the above mentioned photodetector 91 comprises 16 data reading receiving regions 91-A1 to 91-A16 arranged in response to the above mentioned data pattern of 16 bits in the track width direction shown, for example, in FIG. 17, 5 pairs of clock producing receiving regions 91-B1 to 91-B10 arranged as separated in the tracking direction so as to receive the image of the guide pattern 103 and 4 pairs of servo signal detecting receiving regions 91-C1 to 91-C4 and 91-D1 to 91-D4 arranged as separated and opposed in the track width direction so as to receive the images of both edges in the track width direction of the guide pattern 103. By the way, the reference numeral 100 represents an image of the above mentioned light emitting part 84a of the above mentioned LED 84 formed on the above mentioned photodetector 91 as reflected by the above mentioned optical card 11.

Here, in FIGS. 14 and 15, the arranged position of the above mentioned LED 84 to which the above mentioned sapphire spherical lens 92 is bonded and fixed and the magnification of the optical system are set so that the projecting plane 69 may be formed near the outside of the inside servo signal detecting receiving regions 91-D1 to 91-D4 as shown by the solid line in FIG. 7 in the luminous intensity distribution in the diametral direction of the above mentioned light emitting part 84a as imaged in the above mentioned photodetector 91 when the recording surface of the above mentioned optical card 11 is in the focused position of the above mentioned objective lens 88.

Figure 19:
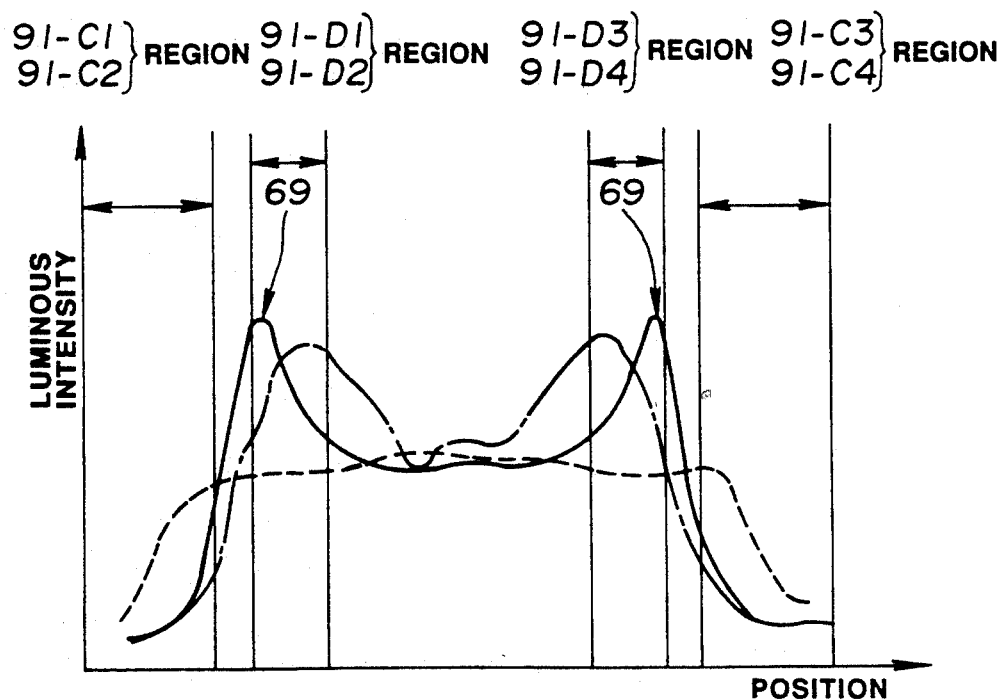

Thus, when the above mentioned optical card 11 becomes near to the focused position of the above mentioned objective lens 88, the luminous intensity distribution on the above mentioned photodetector 91 will be as shown by the broken line in FIG. 19 but, on the contrary, when the above mentioned optical card 11 becomes far from the focused position of the above mentioned objective lens 88, the luminous intensity distribution will be as shown by the one-point chain line. That is to say, when the above mentioned optical card 11 becomes near to the above mentioned objective lens 88 side, the light amount entering the outside servo signal detecting receiving regions 91-C1 to 91-C4 will increase but the light amount entering the inside servo signal detecting receiving regions 91-D1 to 91-D4 will decrease. On the contrary, when the above mentioned optical card 11 becomes far from the above mentioned objective lens 88 side, the light amount entering the outside servo signal detecting receiving regions 91-C1 to 91-C4 will decrease but the light amount entering the inside servo signal detecting receiving regions 91-D1 to 91-D4 will increase.

Further, a focus error signal FE is obtained on the basis of the difference between the output sum of the outside servo signal detecting receiving regions 91-C1 to 91-C4 and the output sum of the inside servo signal detecting receiving regions 91-D1 to 91-D4 and a tracking error signal TE is obtained on the basis of the difference between the output sum of the servo signal detecting receiving regions 91-D1 and 91-D3 and the output sum of the servo signal detecting receiving regions 91-D2 and 91-D4.

Also, a clock signal is obtained on the basis of the difference between the output sum of the above mentioned clock producing receiving regions 91-B1, 91-B3, 91-B5, 91-B7 and 91-B9 of one of the clock producing pair and the output sum of the above mentioned clock producing receiving regions 91-B1, 91-B3, 91-B5, 91-B7 and 91-B9 of the other and data of 16 bits are simultaneously read from the outputs of the above mentioned data reading receiving regions 91-A1 to 91-A16 as synchronized with this clock signal. The above mentioned clock signal is produced by receiving the image of the above mentioned optical card 11 in the 5 pairs of the above mentioned clock producing receiving regions 91-B1 to 91-B10 of the above mentioned photodetector 91 and therefore can be a relative position information in the tracking direction of this optical card 11. For example, if the size of one bit of the above mentioned guide pattern 103 is 5×5 μm, the same edge of a clock signal will be produced in a period corresponding to 10 μm and a position information having a resolution of 10 μm will be obtained.

Figure 20:
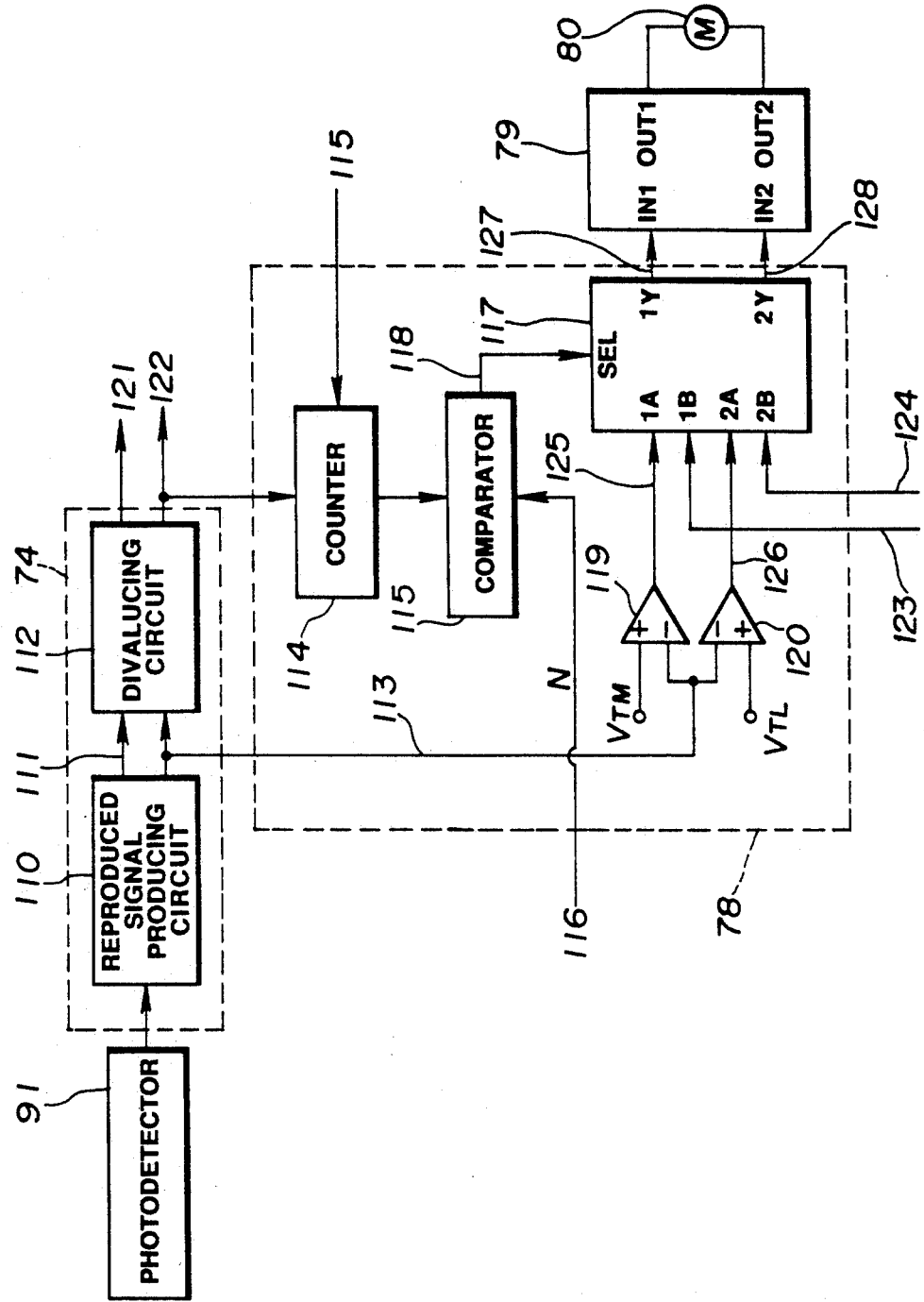

As shown in FIG. 20, the main part of this embodiment comprises the above mentioned photodetector 91, demodulating circuit 74, position controlling circuit 78, driving circuit 79 and card motor 80.

The output from the above mentioned photodetector 91 is input into a reproduced signal producing circuit 110 within the above mentioned demodulating circuit 74, an analogue A reading signal 111 and an A clock signal 113 which is a synchronized signal are produced and these A reading signal 111 and A clock signal 113 are converted respectively to a D reading signal 121 of a digital signal and a D clock signal 122 which are output to the system controller 75 shown in FIG. 13.

Into a counter 114 are input a preset signal 115 for setting a counted value from this system controller 75 and the above mentioned D clock signal 122 showing the position information of the optical card 11. Into a comparator 115 are input the output of the above mentioned counter 114 and a position setting signal 116 for comparing the counted value from the above mentioned system controller 75 and the output signal 118 of this comparator 115 is input into a selector 117 selecting terminal SEL.

The A clock signal 113 is input into -terminals of comparators 119 and 120, is compared with reference voltages $V_{TH}$ and $V_{TL}$ as shown in the drawing and the output signals 125 and 126 are input respectively into the 1A terminal and 2A terminal of the above mentioned selector 117. Into the 1B terminal and 2B terminal of this selector are input respectively driving signals 123 and 124 determining the driving direction of the optical card 11 from the above mentioned system controller 75. The input signals 1A and 2A or 1B and 2B selected by the selecting terminal SEL of the selector 117 are output respectively from the output terminals 1Y and 2Y as motor controlling signals 127 and 128 for the card motor 80 and can control the rotation of the above mentioned card motor 80 through the above mentioned driving circuit 79. Table 1 shows a driving circuit controlling theory and card motor 80 operating modes.

TABLE 1

| Driving Circuit 9 Inputs | | Card Motor 10 Operating |
|---|---|---|
| IN1 | IN2 | Modes |
| L | L | Stopped. |
| H | L | Normal direction. |
| L | H | Reverse direction. |
| H | H | Braked. |

Figure 21:
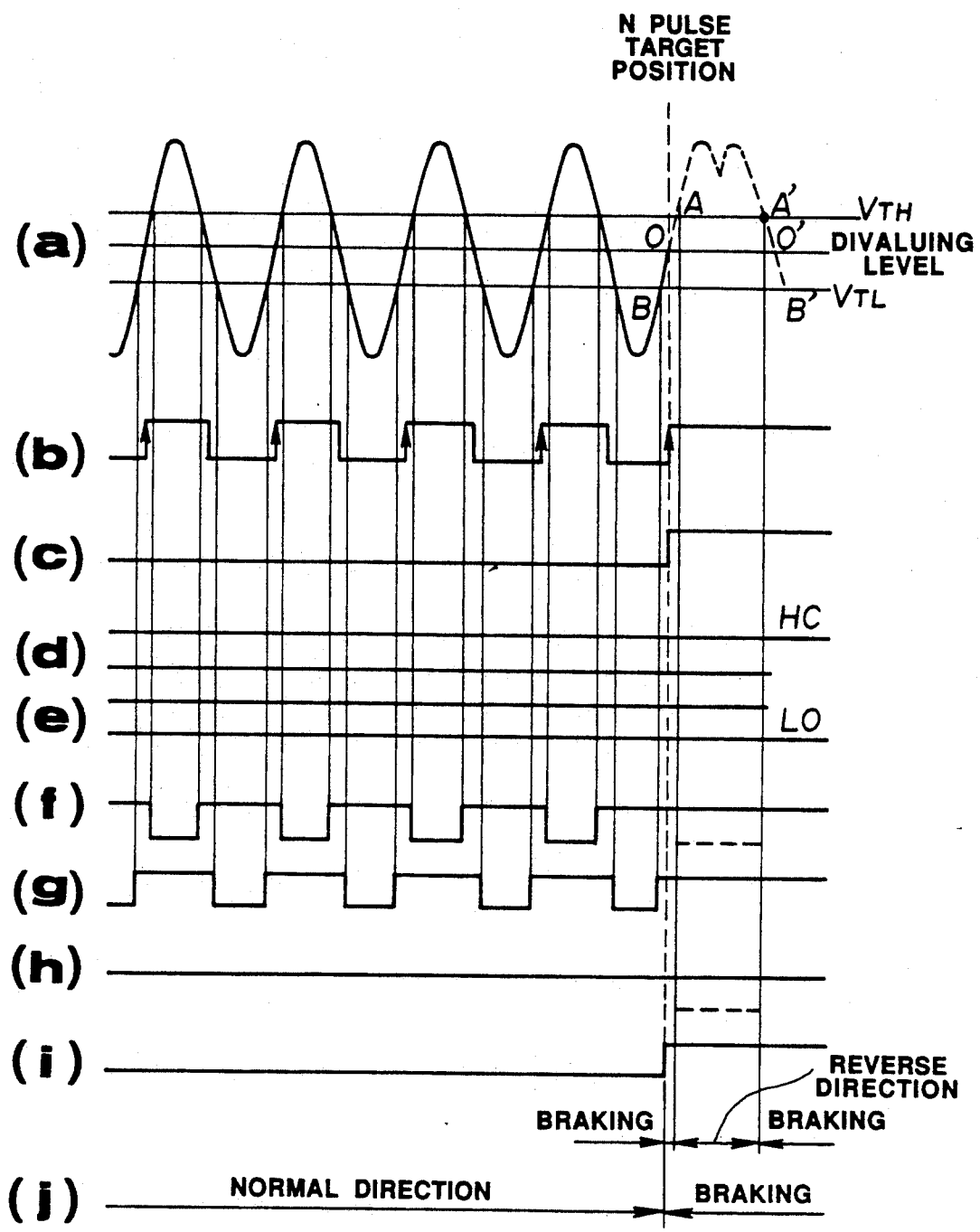
Figure 22:
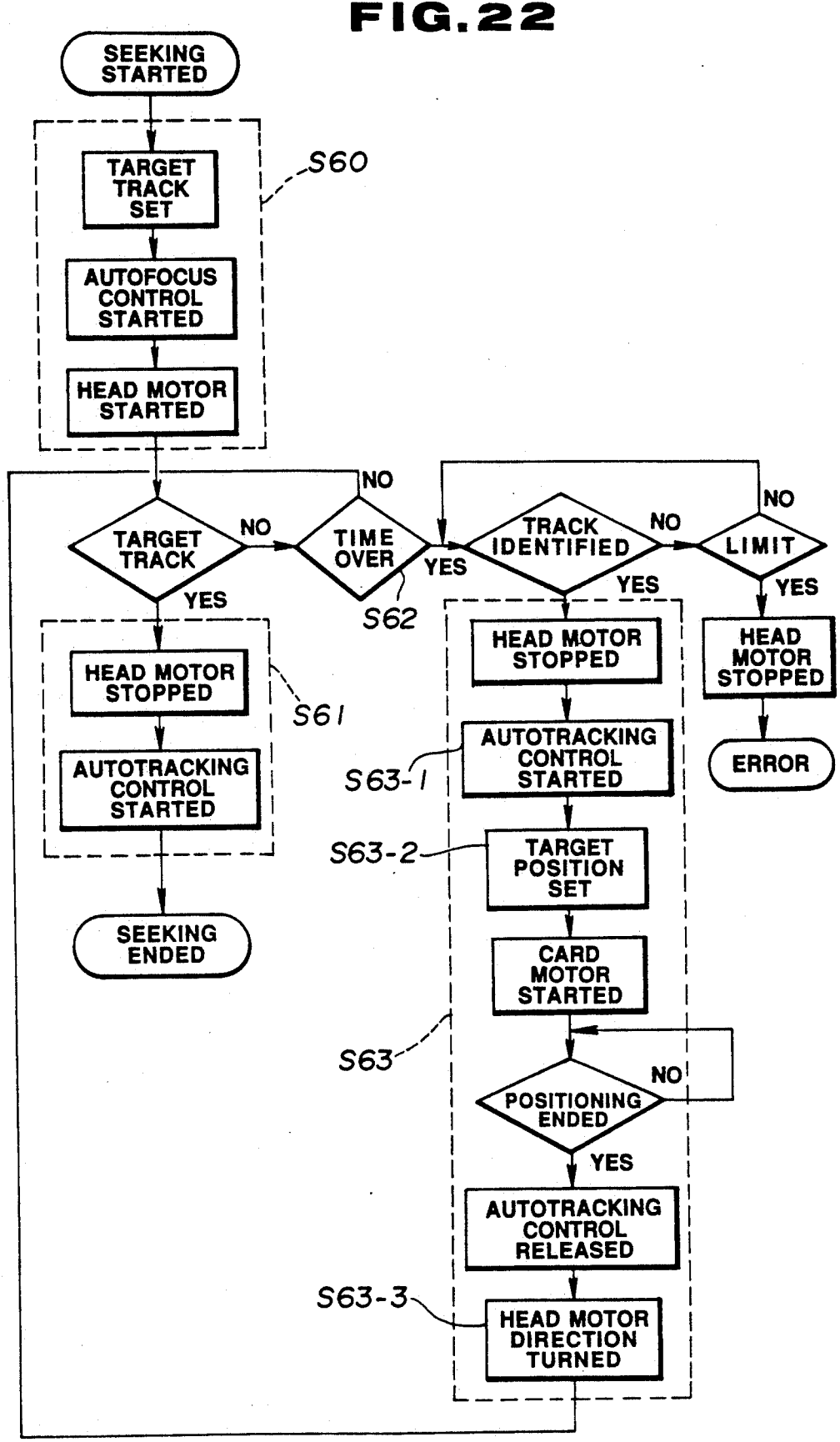

The operation of controlling the relative positioning of the optical card 11 of the thus formed optical information recording/reproducing apparatus 71 shall be explained by using FIGS. 20 to 22.

FIG. 21 shows the timing for controlling the positioning in FIG. 20. In FIG. 21, (a) shows the operating mode of the A clock signal 113, (b) shows the operating mode of the D clock signal 122, (c) shows the operating mode of the comparator 115, (d) shows the operating mode of the driving signal 123, (e) shows the operating mode of the driving signal 124, (f) shows the operating mode of the output signal 125 of the comparator 119, (g) shows the operating mode of the output signal 126 of the comparator 120, (h) shows the operating mode of the motor controlling signal 127, (i) shows the operating mode of the motor controlling signal 128 and (j) shows the operating mode of the card motor 80.

Figure 1:
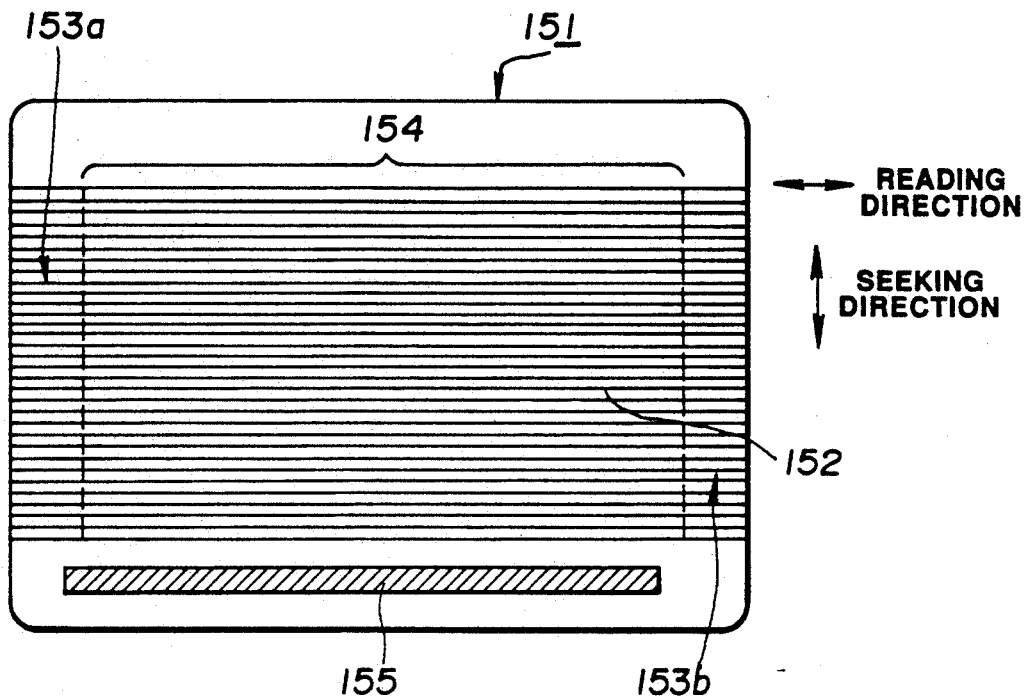
FIG. 1 is an explanatory view showing an optical card in a prior art example.

When the target position point 0 (See (a) in FIG. 1) is in the normal direction rather than in the present position, the number of clocks of the D clock signal 122 until the target position shall be N pulses. When the optical card 11 is to be positioned in the target position, due to the fluctuation of the drive controlling precision of the driving system and the stopping precision of the card motor 80, the card motor 80 will oscillate to repeat a reversing operation. Therefore, a hysteresis width ($V_{TH}$ and $V_{TL}$) is provided so that the optical card 11 may stop between the A point and B point including the target position 0 point.

It is set in the comparator 115 by a signal 116 for setting the position of the number N of pulses corresponding to the target position 0 point from the system controller 5. In the initial state, as the set number N and the counted value of the counter 114 do not coincide with each other, the output signal 118 of the comparator 115 is on the L-level and the selector 117 selects the driving signals 123 and 124.

After the counted value of the counter 114 is initialized with a preset signal 85 from the system controller 75, the system controller 75 places the control signal 127 of the card motor 80 on the H-level and the control signal 128 of the card motor 80 on the L-level and rotates the card motor 80 in the normal direction. When the card motor 80 is rotated in the normal direction, the D clock signal 122 will be input into the counter 114 and the D clock signal will be counted.

When the counter 114 has counted N pulses (when the optical card 11 has moved to the target position), the comparator 115 will place the output signal 118 on the H-level and the selector 117 will select the output signals 125 and 126 of the comparators 119 and 120, that is to say, the control signal 127 of the driver circuit 79 will become the output signal 125 of the comparator 119, the control signal 128 will become the output signal 126 of the comparator 120 and therefore the card motor 80 will be shortly braked and will stop the optical card 11 at the 0 point to the A point.

By the way, the dotted lines in (a), (f) and (pi h) in FIG. 21 represent the states when the A point is exceeded by the over-run of the optical card 11 after braking, the card motor 80 is rotated in the reverse direction and is again shortly braked and the optical card stops stops at the A' point to the O' point.

Thus, it is possible to position the optical card near the rising edge of the D clock signal 122 corresponding to the target position.

Now, a sequence example of the re-seeking by the relative positioning control of the optical card 11 in the above described optical information recording/reproducing apparatus 1 shall be explained by using the flow chart in FIG. 22.

In the seeking operation, in the block S60, a target track is set, an autofocus control is started and the head motor 82 driving the photopickup 73 is started. When the target track is detected, the process will advance to the block S61, the head motor 82 will be stopped, an autotracking control will be started and the seeking operation will end.

In case the target track is not detected within the anticipated time and the time is over, the track will be identified to see whether the present position of the photopickup 73 is on the track or not by a specific identification pattern common to the respective tracks for identifying the track numbers formed by the bands 68-1 to 68-8 shown in FIG. 17 and the identification pattern of the track will be detected to the limit of the seeking direction of the optical card. In case it can not be detected, the head motor 82 will be stopped and the seeking operation will be stopped as a seeking error.

In case the identification pattern of the track has been detected, the process will advance to the block S63, the head motor 82 will be stopped, an autotracking control will be started as shown in the step S63-1 and the target position for the relative positioning control of the optical card 11 in the above described optical information recording/reproducing apparatus will be set in the step S63-2.

There are two methods of setting this target position, one is for the case of having first sought it after inserting the optical card 11 and the other is for the case of having sought it for the second time and after.

In the case of having first sought it after inserting the optical card, in FIG. 15, after the optical card 11 is inserted, the photopickup 73 will be positioned in the track direction by the card driving pattern 15a or 15b and will be located substantially in the center of the ID region 14a or 14b. The photopickup 73 will operate to seek in this operation. When a time sufficient for seeking the target track is set and the target track can not be reached within this set time, the over-time will be a seeking error and the target position will be set as follows by the track arriving just after this over-time.

(1) The moving distance is set.

When the ID region 14a width is, for example, 3 mm, the photopickup 73 will be positioned in the ID region 14a about 1.5 mm from the data region 13a. If the size of a defect or flaw of the optical card 11 is below 200 $\mu$m, the resolution of the position information (D clock signal) will be 10 $\mu$m and therefore a numerical value of 20 will be set by the position setting signal 116 in the comparator 115.

(2) The counted value is reset with the preset signal 45 in the counter 114.

(3) The moving direction is set and the card motor is started.

After moving, the moving direction shall be a normal direction (toward the central part from the optical card 11 end) lest the recording/reproducing position of the photopickup 73 should deviate from the optical card 11. The driving signal 123 shall be on the H-level and the driving signal 124 shall be on the L-level.

In case the seek for the second time and after has been made, the recording and/or reproduction will be made in a certain track. At this time, while monitoring the reproduced signal or number of clocks, the system controller 75 will detect the boundary, for example, between the data region 13a and ID region 14a. When the ID region 14a is detected, the system controller 75 will set the target position within the ID region of the photopickup 73 as follows:

(1) The moving distance is set.

A numerical value of 150 is set by the position setting signal 116 in the comparator 115. Therefore, the moving distance will be 1.5 mm from the ID region 14a detecting position.

(2) The counted value is reset by the preset signal 115 in the counter 114.

(3) The moving direction is set and the card motor 80 is started.

After moving, the moving direction shall be a normal direction (toward the central part from the optical card 11 end) lest the recording/reproducing position (light beam) of the photopickup 73 should deviate from the optical card 11. The driving signal 123 shall be on the H-level and the driving signal 124 shall be on the L-level.

Then the autotracking control is released and then, in the step S63-3, the rotating direction of the head motor 82 is reversed. Thus, the target position is determined and the re-seek is made.

By the way, in case the target track can not be detected in the re-seek, the operation will be made 7 times at most.

As in the above, the optical information recording-/reproducing apparatus 71 can control the relative positioning of the optical card 11 at a high precision with a simple formation and the seeking operation to the target track of the optical card 11 can be made quickly and positively.

By the way, in this embodiment, the position control is applied to the re-seek but can be applied also to the case of reciprocating the optical card 11 between the ID regions.

By the way, the present invention is not limited to the above described embodiment, different embodiments can be formed, for example, by partly combining the invention and such embodiments also belong to the present invention.

What is claimed is:

1. An optical information reproducing apparatus comprising:
    an optical recording medium in which a guide track formed along a line and respective tracks in which a discriminating information part for discriminating tracks and an information recording part in which information is recorded are formed along a plurality of lines in parallel with said guide track are formed in parallel;
    an optical head provided with a light beam generating means for radiating a light beam to said optical recording medium, an optical system radiating said light beam in a range larger than one track width to said optical recording medium and a photodetector receiving through said optical system the light reflected by said optical recording medium;
    a first moving means for moving said optical recording medium or said optical head in a direction parallel with said track;
    a second moving means for moving said optical recording medium or said optical head in a direction crossing said track;
    a discriminated information reproducing means for reading the information of said discriminated information part from the signal photoelectrically converted by said photodetector in case said second moving means is driven;
    a detecting signal outputting means for outputting a detecting signal that a target track has been detected in case the information output by said discriminated information reproducing means coincides with the target discriminated information targeted by the information output by said discriminated information reproducing means;
    a judging means for judging whether the seeking of the target track has succeeded or not on the basis of said detecting signal; and
    a controlling means for controlling the re-seeking operation wherein, when the seeking of said target track is judged by said judging means to have failed, said first moving means will be driven, then said second moving means will be driven again and the information of said discriminated information part will be read by said discriminated information reproducing means.

2. An apparatus according to claim 1 further having a focus controlling means comprising:
    a focus error signal producing means for producing a focus error signal representing a position displacement from the focus position of said optical system with respect to said optical recording medium from the signal photoelectrically converted by said photodetector; and
    a focus actuator wherein a signal based on said focus error signal is fed and said optical system is moved in the distance direction vertical to the plane of said optical recording medium to hold said optical system in the focused state.

3. An apparatus according to claim 1 further having a tracking controlling means comprising:
    a track error signal producing means for producing a track error signal representing a position displacement from the center of said track of the spot position of the light beam radiated to said optical recording medium from the signal photoelectrically converted by said photodetector; and
    a tracking actuator wherein a signal based on said track error signal is fed and said optical system is moved in the track crossing direction crossing said track to hold said spot position in the tracking state.

4. An apparatus according to claim 1 wherein said controlling means comprises a fixed amount movement controlling means for controlling said first moving means to move either said optical recording medium or said optical head by a fixed amount in a direction parallel with said track.

5. An apparatus according to claim 4, wherein said fixed amount movement controlling means moves either said optical recording medium or said optical head in a direction parallel with said track on the basis of the output signal of said photodetector.

6. An apparatus according to claim 1, wherein said first moving means is formed of a recording medium moving motor for moving said optical recording medium in a direction parallel with said track.

7. An apparatus according to claim 6, wherein said controlling means comprises a fixed amount movement controlling means for controlling said recording medium moving motor to move said optical recording medium by a fixed amount in a direction parallel with said track.

8. An apparatus according to claim 1, wherein said second moving means is formed of a head moving motor for moving said optical head in a direction crossing said track.

9. An apparatus according to claim 1, wherein said discriminated information part of said optical recording medium comprises track inherent discriminated information parts which differ for the respective tracks and a common discriminated information part common to the respective tracks, and said discrimination information reproducing means discriminates said inherent discriminated information parts at a timing identifying said common discriminated information part.

10. An apparatus according to claim 1, wherein said controlling means controls the operation of said second moving means to stop operation whenever said detecting signal is output.

11. An apparatus according to claim 3, wherein said controlling means stops the operation of said second moving means when said detecting signal is output and then controls whether first said detecting signal is output while said tracking controlling means is operated.

12. An apparatus according to claim 11, wherein said judging means has a counting means for counting the number of times when said detecting signal is not output while said tracking controlling means is operated.

13. An apparatus according to claim 11, wherein said judging means will judge the seek to be a success if the number of times from the start of seeking said target track of said optical recording medium by driving said second moving means until said detecting signal is output while said tracking controlling means is operated is smaller than the set number of times.

14. An apparatus according to claim 12 wherein said judging means will judge the seek to be a failure in case the counted value output by said counting means reaches the set counted value.

15. An apparatus according to claim 3, wherein said detecting signal outputting means has an approximate signal outputting means outputting an approximate signal that the target track is detected to be near when the information output by said discriminated information reproducing means does not coincide with the target discriminated information and when said output information is near to said target discriminated information.

16. An apparatus according to claim 15, which has a means of counting zero cross pulses of said tracking error signal output from said tracking controlling means when said tracking controlling means is switched off and in which said judging means will monitor whether or not said approximate signal is output from said detecting signal within the number set by said counting means when said approximate signal is output.

17. An apparatus according to claim 16, wherein said judging means has a second counting means for counting the number of time the counted value of said counting means exceeds said set number.

18. An apparatus according to claim 17 wherein said judging means will judge the seek to be a failure when the counted value of said second counting means reaches a set number.

19. An apparatus according to claim 1, wherein said judging means will judge the seek to be a failure in case said target track cannot be set to be followed by the set time after the seek starting time when said target track of said optical recording medium is sought by driving said second moving means.

20. An apparatus according to claim 3 wherein said controlling means has a fixed amount movement controlling means for controlling said first moving means to move by a fixed amount either said optical recording medium or said optical head in a direction parallel with said track.

21. An apparatus according to claim 20 wherein said fixed amount movement controlling means comprises:
a demodulating circuit wherein, while said tracking controlling means is operated, the guide pattern information formed on said guide track will be demodulated from the photoelectric conversion output of said photodetector and a signal corresponding to the position information in said guide track direction will be produced;
a comparing means for comparing whether or not the output signal of said demodulating circuit coincides with a reset target value; and
a stopping controlling means for stopping the operation of said first moving means by the output of said comparing means.

22. An apparatus according to claim 21, wherein said demodulating circuit produces a sine wave signal and a divalued signal made by divaluing said sine wave signal as signals corresponding to said position information and outputs said divalued signal to said comparing means, and said comparing means comprises:
a counter counting said divalued signal and a comparator comparing whether or not the counted value of said counter coincides with said target value and outputting the coinciding signal when it is judged to coincide.

23. An apparatus according to claim 22, wherein said comparing means further has a window type comparator judging whether or not the level of said since wave signal is within a set range including a zero level.

24. An apparatus according to claim 23, wherein said stopping controlling means has a selector wherein the selection is controlled by said coinciding signal so that, when said coinciding signal is applied, the operation of said first moving means will be controlled by the output of said window type comparator and, in case the output of said window type comparator is within the set range, the operation of said first moving means will be stopped.

25. An apparatus according to claim 3, wherein said first moving means comprises:
a recording medium moving motor for moving said optical recording medium in a direction parallel with said track.

26. An apparatus according to claim 25, wherein said fixed amount movement controlling means comprises:
a demodulating circuit wherein, while said tracking controlling means is operated, the guide pattern information formed on said guide track will be demodulated from the photoelectric conversion output of said photodetector and a signal corresponding to the position information in said guide track direction will be produced;
a comparing means for comparing whether or not the output signal of said demodulating circuit coincides with a preset target value; and
a stopping controlling means for stopping the operation of said recording medium moving motor by the output of said comparing means.

27. An apparatus according to claim 26, wherein said demodulating circuit produces a sine wave signal and a divalued signal made by divaluing said sine wave signal as signals corresponding to said position information, and outputs said divalued signal to said comparing means, and said comparing means comprises:
a counter counting said divalued signal and a comparator comparing whether or not the counted value of said counter coincides with said target value and outputting the coinciding signal in case it is judged to coincide.

28. An apparatus according to claim 27, wherein said comparing means further has a window type comparator judging whether or not the level of said since wave signal is within a set range including a zero level.

29. An apparatus according to claim 28, wherein said stopping controlling means has a selector wherein the selection is controlled by said coinciding signal so that, when said coinciding signal is applied, the operation of said recording medium moving motor will be controlled by the output of said window type comparator and, in case the output of said window type comparator is within the set range, the operation of said recording medium moving motor will be stopped.

30. A method of seeking a target track comprising:
a moving step of moving an optical recording medium in which a plurality of respective tracks are formed in parallel in which are formed a track inherent information part in which are recorded track inherent informations different for respective tracks along a guide track formed along a line and a plurality of lines parallel with said guide line, and an information recording part which can record any information, and an optical head for reading said track inherent information by receiving the reflected light of the light spot radiated to said optical recording medium toward a target track to be south in the direction crossing said tracks;
a track detecting step for detecting whether the information read by said optical head during said moving step operation coincides with the track inherent information of the target track;
a judging step for judging whether said light spot is set in a tracking state following said target track on the basis of the output signal of said track detecting step;
a minute movement and re-seek controlling step wherein, in case a signal judging the seek to be a failure is output by said judging step, said optical head or said optical recording medium will be moved by a minute amount in a direction parallel with said track and then said moving step and said detecting step will be made again.

31. A method according to claim 30, wherein when said light spot is not set in the tracking state following said target track within a fixed time from the start of said moving step, said judging step will output a signal judging the seek to be a failure.

32. A method according to claim 30, wherein, when the number of times when the track inherent information read as set in the tracking controlling state from the start of said moving step does not coincide with the inherent information of the target track exceeds the set number of times, said judging step will output a signal judging the seek to be a failure.

33. A method according to claim 30 wherein, in said minute movement and re-seek controlling step, when said optical head or said optical recording medium is moved by a minute amount in the direction parallel with said track, the control will be made on the basis of the position signal in said guide track direction produced by demodulating the guide pattern information formed on said guide track.

* * * * *